United States Patent
Volmering et al.

(10) Patent No.: US 11,141,700 B2
(45) Date of Patent: Oct. 12, 2021

(54) MEMBRANE FILTER AND FILTERING METHOD

(71) Applicant: MEMBION GMBH, Roetgen (DE)

(72) Inventors: Dirk Volmering, Aachen (DE); Klaus Vossenkaul, Aachen (DE)

(73) Assignee: MEMBION GMBH, Roetgen (DE)

( * ) Notice: Subject to any disclaimer, the term of this patent is extended or adjusted under 35 U.S.C. 154(b) by 984 days.

(21) Appl. No.: 15/062,152

(22) Filed: Mar. 6, 2016

(65) Prior Publication Data

US 2017/0087518 A1 Mar. 30, 2017

Related U.S. Application Data

(63) Continuation of application No. PCT/EP2014/069342, filed on Sep. 11, 2014.

(30) Foreign Application Priority Data

Sep. 11, 2013 (DE) .......................... 102013218188.4

(51) Int. Cl.
*B01D 61/18* (2006.01)
*B01D 63/02* (2006.01)
(Continued)

(52) U.S. Cl.
CPC ............. *B01D 65/08* (2013.01); *B01D 61/18* (2013.01); *B01D 63/02* (2013.01); *B01D 63/024* (2013.01);
(Continued)

(58) Field of Classification Search
CPC ............ B01D 2313/26; B01D 2321/18; B01D 2321/185; B01D 63/024; B01D 63/043;
(Continued)

(56) References Cited

U.S. PATENT DOCUMENTS 4,396,510 A * 8/1983 Hsei ........................ B01D 63/02
210/321.8
5,910,250 A 6/1999 Mahendran et al.
(Continued)

FOREIGN PATENT DOCUMENTS

| DE | 10045227 C1 | 2/2002 |
|---|---|---|
| DE | 102011110591 | 2/2013 |

(Continued)

*Primary Examiner* — Ana M Fortuna
(74) *Attorney, Agent, or Firm* — Von Rohrscheidt Patents

(57) ABSTRACT

A membrane filter for filtering a liquid to be filtered, having a downwardly open base element through which flow can pass and which has a tubular shell and precisely one membrane carrier arranged therein, wherein the membrane carrier is connected to the shell by way of at least one anchoring point, having hollow fiber-type membranes fastened at the top in the membrane carrier, having a circumferentially closed pipe which, adjoining the top of the shell of the base element, surrounds the hollow fiber-type membranes, having a gas inlet into the base element, having at least one permeate collecting chamber, having at least one permeate outlet, and having at least one downwardly open flow chamber between the shell and the membrane carrier, which flow chamber has an outlet at the top, wherein the at least one flow chamber, in every horizontal section, adjoins both the shell and the membrane carrier.

17 Claims, 15 Drawing Sheets

(51) Int. Cl.
  *B01D 63/04* (2006.01)
  *B01D 65/08* (2006.01)

(52) U.S. Cl.
  CPC ........ *B01D 63/043* (2013.01); *B01D 2313/08* (2013.01); *B01D 2313/20* (2013.01); *B01D 2313/26* (2013.01); *B01D 2315/06* (2013.01); *B01D 2321/185* (2013.01)

(58) Field of Classification Search
  CPC ........ B01D 65/02; B01D 65/08; B01D 63/02; B01D 2053/224; B01D 2313/20; B01D 2313/21; B01D 53/78; B01D 2313/105; B01D 61/18; B01D 63/022
  See application file for complete search history.

(56) References Cited

U.S. PATENT DOCUMENTS

| | | | | |
|---|---|---|---|---|
| 6,126,819 A * | 10/2000 | Heine | ............... | B01D 63/024 |
| | | | | 210/139 |
| 6,524,481 B2 * | 2/2003 | Zha | ............... | B01D 63/02 |
| | | | | 210/321.69 |
| 8,287,743 B2 * | 10/2012 | Zha | ............... | B01D 63/024 |
| | | | | 210/797 |
| 2004/0035779 A1 * | 2/2004 | Vossenkaul | ......... | B01D 63/024 |
| | | | | 210/321.6 |
| 2005/0006308 A1 * | 1/2005 | Cote | ............... | B01D 63/026 |
| | | | | 210/636 |
| 2006/0175247 A1 * | 8/2006 | Cooper | ............... | A47J 43/285 |
| | | | | 210/470 |
| 2009/0255872 A1 * | 10/2009 | Busnot | ............... | B01D 61/18 |
| | | | | 210/636 |
| 2010/0013110 A1 * | 1/2010 | Schaefer | ............... | B01D 63/024 |
| | | | | 261/43 |
| 2011/0272335 A1 * | 11/2011 | Cote | ............... | B01D 61/18 |
| | | | | 210/150 |
| 2012/0091602 A1 * | 4/2012 | Cumin | ............... | B01F 13/0255 |
| | | | | 261/122.1 |
| 2012/0175247 A1 * | 7/2012 | Darrel | ............... | H03K 5/13 |
| | | | | 204/229.3 |
| 2015/0136697 A1 * | 5/2015 | Sakurai | ............... | B01D 63/04 |
| | | | | 210/650 |

FOREIGN PATENT DOCUMENTS

| | | | | |
|---|---|---|---|---|
| EP | 0655418 | | 5/1995 | |
| EP | 0947237 | A1 | 10/1999 | |
| EP | 2529827 | A2 | 12/2012 | |
| WO | WO2006047814 | | 5/2006 | |
| WO | WO 2011/136888 A1 * | | 11/2011 | ............ B01D 61/00 |
| WO | WO2011/136888 A1 | | 11/2011 | |
| WO | WO2014011204 A1 | | 1/2014 | |

* cited by examiner

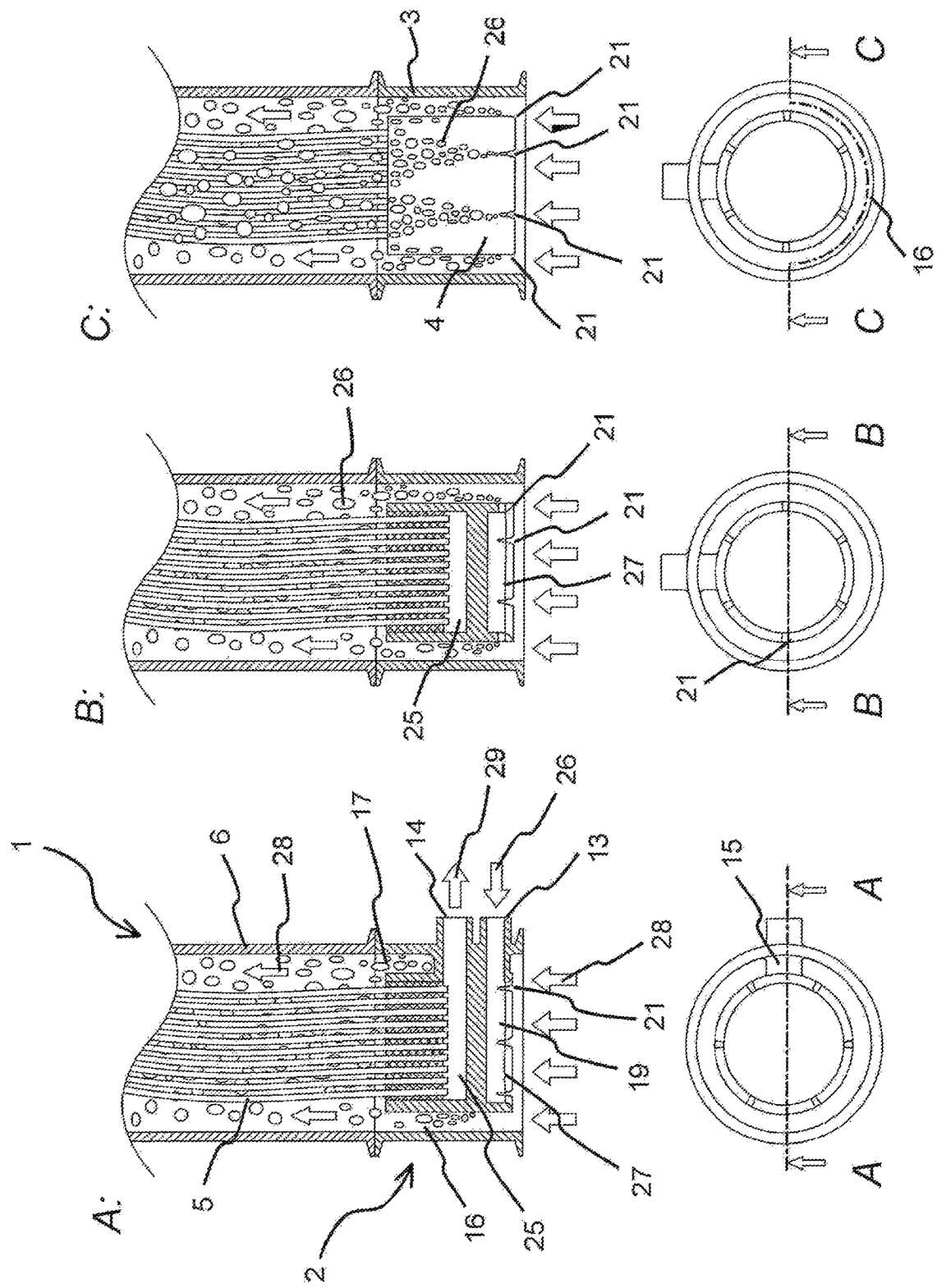

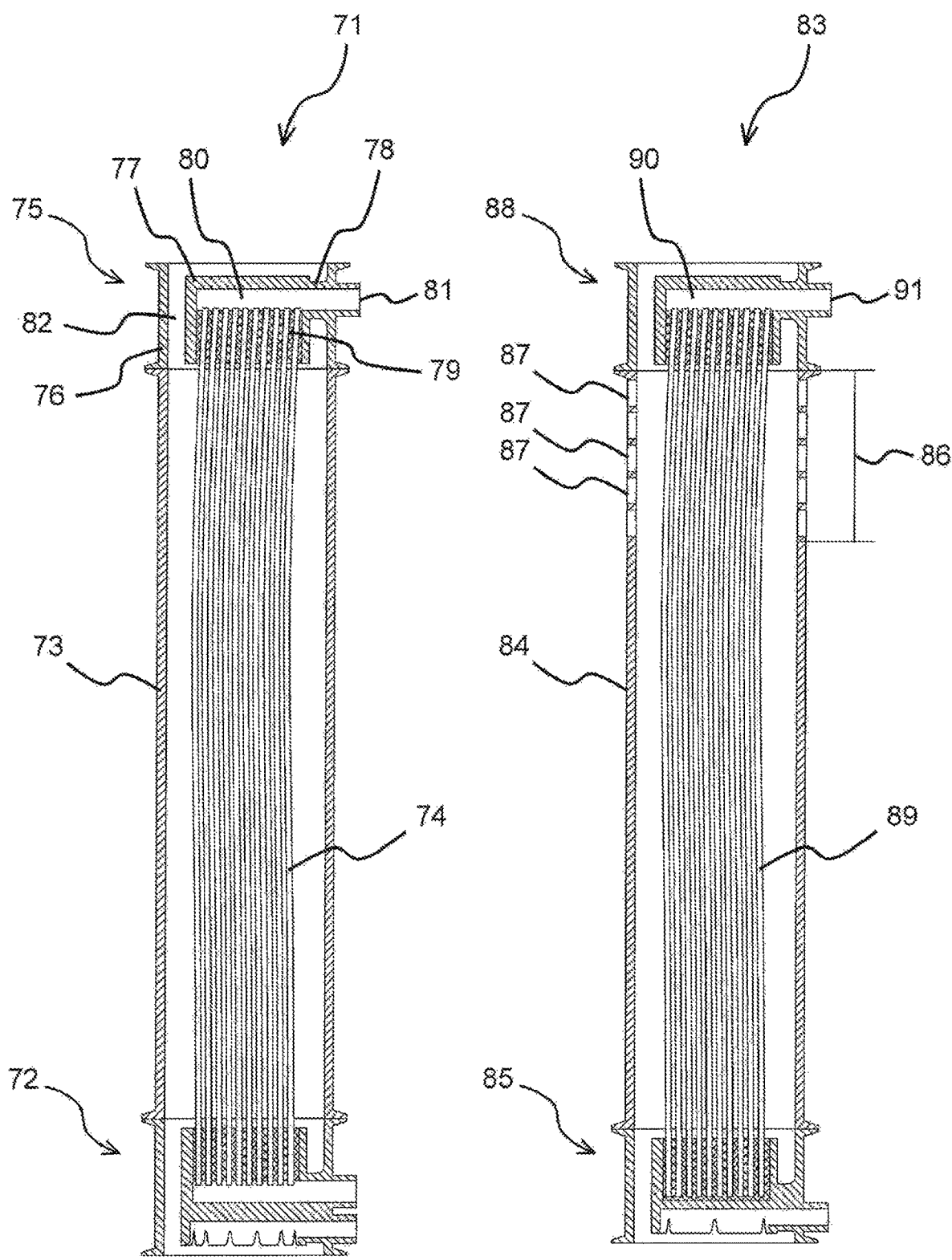
FIG. 7A  FIG. 7B

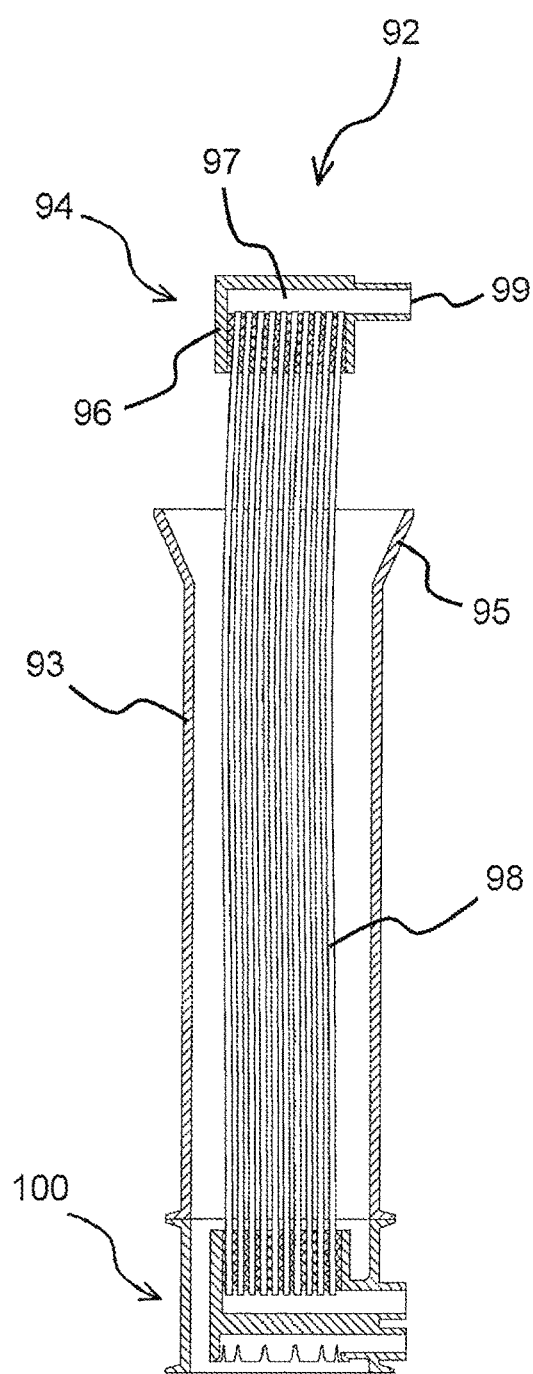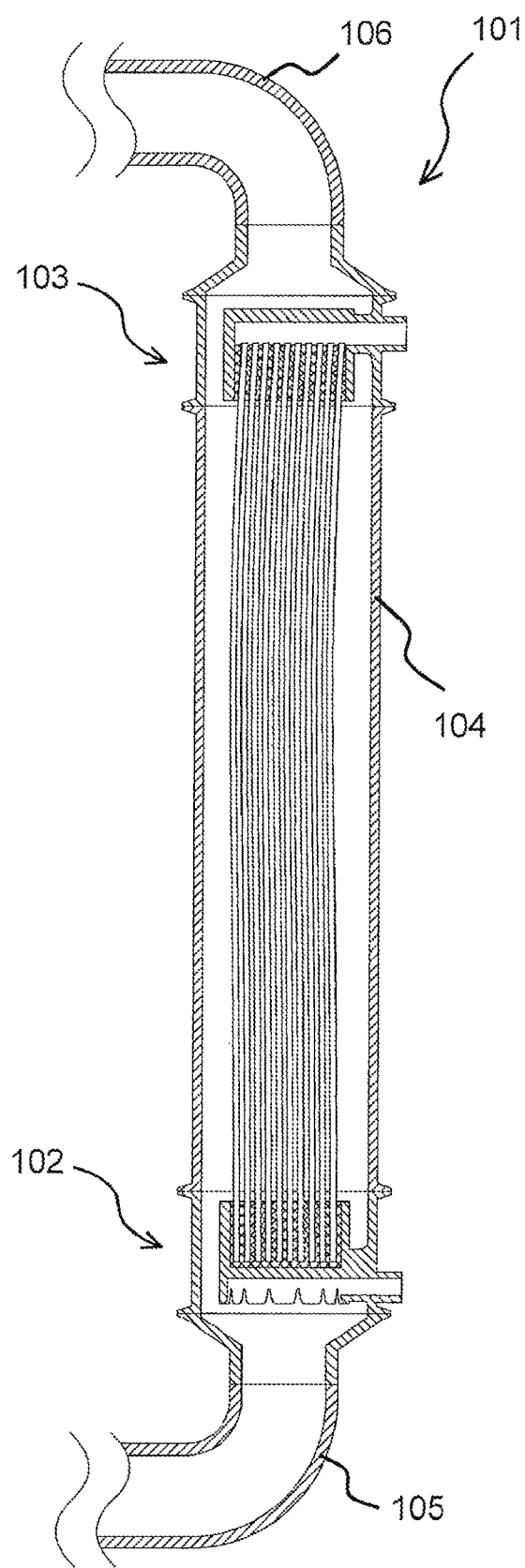
FIG. 7C  FIG. 7D

MEMBRANE FILTER AND FILTERING METHOD

RELATED APPLICATIONS

This application is a continuation of International Patent Application PCT/EP2014/069342 filed on Sep. 11, 2014 claiming priority from German patent applications DE 10 2013 218 188.4 filed on Sep. 11, 2013 both of which are incorporated in their entirely by this reference.

FIELD OF THE INVENTION

The invention relates to a membrane filter for filtering a liquid.

BACKGROUND OF THE INVENTION

A membrane filter of the general type described supra is known from WO 02/22244-A1 wherein one of the inventors of the instant application was a co-inventor.

The known membrane filter is configured to filter waste water heavily loaded with solids that can be found for example in biological waste water treatment plants in membrane bioreactors (MBR). Thus, the membrane filter can either be submerged in the tanks of the waste water treatment plant or it can be set up on dry land and provided with inlet and outlet conduits. A driving force for the filtration is in many cases implemented by a vacuum applied on a permeate side but can also be implemented in the dry variant by a small positive pressure on the feed side with waste water. The hollow fiber membranes have a diameter of the less than 5 mm, typically 0.5 mm to 3 mm and have a permeability of microfiltration membranes or ultra-filtration membranes. Using hollow fiber membranes for reverse osmosis or nano filtration is also possible.

In order to prevent a blocking of the membrane filter with filtered solids the membrane filter is flushed continuously or in periodic intervals. Typical methods for physical flushing of the membrane filters use permeate side back flushing of the hollow fiber membranes with liquid or gas combined with gas bubble flushing on an outside of the hollow fiber membranes. The latter introduces gas bubbles from below into the membrane filter, wherein the gas bubbles then rise along the hollow fiber membranes and move the hollow fiber membranes in the liquid to be filtered. The rising gas bubbles always also generate an upward flow of the liquid. The shear force of the two phase flow including gas and liquid has a high level of turbulence which removes coatings from the membranes and flushes them out. The membrane bioreactors typically use air as gas.

The so called mammoth pumping effect, this means the upward flow of the liquid through the membrane filter induced by the rising gas bubbles has a particularly high cleaning effect upon the hollow fiber membranes when the hollow fiber membranes are enveloped by a circumferentially closed tube because this keeps the gas bubbles in the membrane filter, this means in direct proximity to the hollow fiber membranes. The positive effect of the tube is described among others in JP-2003 024937 and US 2006 027 3007 A1.

In one embodiment of the known membrane filter hollow fiber membranes of the membrane filter that is useable in a submerged or dry version are fixated in at least one membrane carrier which is connected with a tubular shell of the base element through six attachment locations. The membrane filter includes a permeate collecting cavity to which the hollow fiber membranes are connected. The hollow fiber membranes are closed individually on top.

Additionally the base element in this membrane filter includes a gas inlet which is connected through a gas channel to a mouth piece which protrudes between the hollow fiber membranes. Through the mouth piece the gas above the membrane carrier is introduced between the hollow fiber membranes into the liquid to be filtered. The mammoth pump effect of the introduced gas suctions the liquid from below through six bore holes between the anchor locations of the base-element. The bore holes form flow cavities in the base element which are arranged between the membrane carrier and the shell. The liquid flows through the module base in these flow cavities and then after being mixed with the gas introduced at a top of the module base rises together with the gas in the membrane filter, before the gas and the liquid flow out of the membrane filter on top. It is characteristic that the liquid only flows through the base element through the six bore holes, this means flow cavities which are arranged between the shell and the membrane carrier. There are no additional pass through openings in the base element for a flow through of the liquid. This means the membrane carrier closes the base element besides the flow cavities.

It is furthermore characteristic that the gas and the liquid are introduced to the hollow fiber membranes separately, this means the liquid flows through the flow cavities between the shell and the membrane carrier from below the membrane carrier and the gas flows centrally from a mouth piece from above the membrane carrier to the hollow fiber membranes.

In the base element in particular the parallel connected flow cavities configured as small bore holes for flowing the liquid through are prone to blocking. When material is deposited in one of the parallel connected bore holes or when a cross section is reduced therein, for example by flushed in leaves or fibrous compounds the flow through velocity in the bore hole is reduced and a risk of additional blocking increases. Such flow through systems of parallel connected small bore holes are therefore designated as unstable in process engineering. A starting blockage in a flow channel self accelerates and leads to a complete blockage of the respective flow channel if sufficient alternative flow paths are available to flow. For example when one of the bore holes in the known membrane filter with 6 parallel bore holes starts blocking the remaining five bore holes can compensate the reduced flow through. During a complete blockage of the bore hole the other bore holes only have to increase their flow through by 20%. The risk of blocking parallel connected internally connected channels continuously decreases with a decreasing number of channels and increasing channel cross sections.

Besides the risk of blocking bore holes in the base element there is another problem in the known membrane filter directly above the attachment locations. In a flow shadow of the attachment locations there is a risk of accretion of particles which can lead to a partial clogging of the filter. The problem of accumulating particles in less turbulent flow areas is particularly high in membrane bioreactors by nature since the liquid to be filtered is a sludge in which many particles, hair, fibrous compounds and other contaminants are included which tend to form accretions and blockings.

The third problem of the known membrane filter is insufficient gas distribution during scale up of the system with a central mouth piece at a top of the membrane carrier. The gas bubbles centrally rising in the middle require an inlet distance before they grow far enough in size or have horizontally expanded so that their reach the entire bundle diameter. With increasing diameter the inlet distance becomes longer and it becomes evident that the maximum diameter of the membrane bundle which can be evenly exposed to the gas is limited to 10 cm at the most. Larger diameters have the effect that an outer portion of the bundle proximal to the lower clamping location is only insufficiently cleaned by energy of the introduced air so that blockages are created.

In the background of the invention also DE 198 119 45A1 describes a membrane filter which includes a base element with a membrane carrier in which hollow fiber membranes are attached. Also in this application one of the instant inventors was a co-inventor. Herein the membrane filter and the base element are enveloped by a common tube. However there is no shell of the base element to which the membrane carrier is connected. The membrane filter has a flow cavity between the membrane carrier and the tube wherein the liquid to be filtered flows through the flow cavity. In addition to this flow cavity the membrane filter includes additional flow through openings for the liquid to be filtered and the gas in an interior wherein the pass through openings are not adjacent to the membrane carrier and the tube. In particular these parallel flowed small pass through openings are problematic because they are very prone to clogging.

BRIEF SUMMARY OF THE INVENTION

It is an object of the invention to provide a membrane filter that has a reduced clogging propensity.

The object is achieved by a membrane filter for filtering a liquid to be filtered including a downward open base element through which a flow of a gas and of the liquid can pass and which has a tubular shell and precisely one membrane carrier disposed therein wherein the membrane carrier is connected to the shell by at least one anchor point, includes hollow fiber membranes fastened at a top of the membrane carrier and respectively including a lumen into which liquid permeate from a liquid to be filtered is filterable, a circumferentially closed pipe which adjoins the top of the shell and envelops the hollow fiber membranes, a gas inlet into the base element, at least one permeate collecting chamber which is connected with the lumens of the hollow fiber membranes for collecting the permeate from the hollow fiber membranes, at least one permeate outlet for draining permeate from the at least one permeate collecting cavity and at least one downward open flow chamber between the shell and the membrane carrier for flowing liquid through which flow chamber has an outlet at a top for draining the liquid into the tube, wherein the at least one flow chamber in each horizontal section through the membrane carrier adjoins both the shell and also the membrane carrier, wherein the at least one flow cavity envelops the membrane carrier and forms an annular gap, wherein the annular gap is only interrupted by the at least one anchor location, wherein a height of the flow cavity is defined by an overlap portion of a height of the membrane carrier and a height of the jacket, and the membrane carrier fully closes the base element with the exception of the at least one flow chamber for the through flow of the liquid from bottom to top.

The object is also achieved by a method for filtering a liquid to be filtered in the membrane filter wherein the liquid flows into the base element, flows through the at least one flow chamber and thus flows around the membrane carrier a gas flows through the gas inlet into the base element, the liquid only flows out through the outlet at a top of the base element and only flows into the tube through the outlet, the gas flows out at a top of the base element, flows into the tube and rises in the tube and thus generates an upward movement in the membrane filter, wherein the rising liquid and the gas flush the hollow fiber membranes on an outside, wherein a pressure differential is provided between an outside of the hollow fiber membranes and the lumens of the hollow fiber membranes, wherein the pressure differential causes a liquid permeate to be filtered from the liquid and to flow into the lumens of the hollow fiber membrane and wherein the permeate from the lumens is connected and flows out of the membrane filter.

Improving upon the known membrane filter it is proposed according to the invention that the base element is sequentially flowable from the gas inlet through the at least one flow cavity to the outlet thus the gas is not introduced like in the known membrane filter through a separate gas conductor centrally to a center of the hollow fiber membranes attached in the membrane carrier but the gas supply is provided together with the liquid through the at least one flow cavity into the outer portion of the hollow fiber membranes. This has plural advantages for a reduction of a blocking propensity of the membrane filter. On the one hand side a shear force of the two phase flow of gas and liquid is also used for flushing the membrane carrier and on the other hand side the gas is also introduced into the a peripheral portion of the membrane bundle directly in a lower portion of the membranes so that blocking propensity is also reduced here.

In an embodiment of the membrane filter it is advantageous that the tube envelops the hollow fiber membranes at least at 50% of their free length, this means its length that is disposed in the liquid. This provides that the mammoth pump effect in the tube generates a sufficiently strong flow in the flow cavity to also flush membrane carriers arranged therein.

A membrane bundle with tight packing of the hollow fiber membrane in a circular cross section however is limited in diameter. Operations of hollow fiber membranes in membrane bioreactors however show that the shear force of the 2 phase flow of liquid and gas depending on operating conditions impacts at the most 2.0-2.5 cm into a bundle of hollow fiber membranes. Therefore the outer diameter of the membrane bundle with circular cross section is limited to approximately 4-5 cm.

The at least one flow cavity includes bulges extending into the membrane carrier according to the invention. Thus a width of the cross sectional surface packed tight with membranes can be reduced to a size which can be flushed over from an outside due to the shear force of gas and liquid. The simplest shape of bulges are bulges in a purely radial direction. In view of the limitation described supra the diameter of the membrane carrier can be increased by the bulges to approximately 8-10 cm.

For larger diameters also other shapes of the bulges and thus geometries of the membrane carrier are conceivable like e.g. a clover shape of the membrane carrier or a membrane carrier in which plural circular membrane bundles are arranged.

In an advantageous embodiment of the membrane filter with a larger diameter the membrane filler includes fingers which are formed by the bulges and which are connected by an anchor of the membrane carrier. The fingers are advantageously arranged in parallel. The designation finger thus relates to a feature in which the fingers grow to a uniform size in a horizontal sectional view through the membrane carrier. This however does not mean that the fingers also have a uniform size in a vertical orientation or that this height correlates with the width in any manner. Thus the fingers provide the option to uniformly configure the width of the portion provided with hollow fiber membranes and to select freely. Thus it is advantageous to configure the width of the portion of the fingers provided with membranes in a range between 2 and 5 cm since an optimum flushing of the portion of the fingers provided with hollow fiber membranes is then also provided proximal to the clamping location.

It is advantageous to keep the number of anchor locations as small as possible since the number of the flow channels for the liquid to be filtered then becomes smaller and simultaneously there flow cross sections become larger. This significantly reduces the problem of blocking the parallel flowed flow channels.

When configuring the membrane filter with fingers it is furthermore advantageous that the membrane carrier is connected with the shell by two anchor locations at the most which are arranged in an extension of the anchor. This has particular advantages for producing the base element as an injection molded component.

In an advantageous embodiment of a membrane filter of this type according to the invention the membrane carrier is connected with the shell only through an anchor location. In this case the entire amount of liquid and gas flowing through the membrane filter jointly flows through this one flow cavity and subsequently flows through its outlet into the tube adjoining on too to the shell of the base element. The mammoth pump effect which is generated in particular by the gas rising in the tube a system of this type can be designated as a quasi-force flow system, this means as long as gas rises in the membrane filter liquid is also suctioned from below from the base element. This means as long as something flows through the membrane filter the one flow channel is not blocked completely and therefore even under partial blocking still has potential to be flushed clear through a higher shear force of the flow. A higher shear force can be implemented for example by increasing the gas volume and thus the turbulence of the flow. An advantage of the option of flushing partially blocked flow channels clear is not provided for plural channels that are switched in parallel and internally flowed. When a channel is partially blocked for such systems then the channel has the tendency to block completely due to the low flow through velocity. In order to clean a completely blocked flow channel again mechanical flushing of the membrane filter with a two phase flow including gas and liquid typically does not suffice by itself. In those cases typically an intense chemical cleaning of the membrane filter or a manual mechanical cleaning is required. The option of flushing partially blocked flow channels clear increases with a decreasing number of parallel flow channels. Thus selecting a single flow channel is advantageous. This however is limited in the membrane filter according to the invention.

Implementing only one anchor location in a membrane filter according to the invention is only useful up to a diameter of approximately 15-18 cm of the base element. In larger membrane carriers it is better for static reasons when the membrane filter includes at least 2 opposite anchor locations. In this embodiment of the membrane filter according to the invention it is advantageous to connect the permeate outlet through one anchor location and the gas inlet through another anchor location.

For fabrication reasons it is advantageous for the configuration of the membrane filter according to the invention with fingers in the membrane carrier to configure the width of the portion of the fingers configured with hollow membranes on both sides of the anchor and also in the portion of the anchor uniform and thus not to configure the small portion between the fingers above the anchor with membranes.

In order to prevent that solids are deposited in a flow shadow of the anchor between the fingers it is advantageous not to configure the cross section of the anchor between the fingers in a vertical direction to the outlet but to let the cross section run out in a tapering manner before that. The same applies also for the configuration of the anchor locations for connecting the membrane carrier with the material.

In this case the membrane carrier is completely separate from the shell in each of the horizontal sectional views above the at least one anchor location, when the shell also reaches on top at least, up to the upper end of the membrane carrier the membrane carrier in this horizontal cross section is completely imbedded in the outlet thus the membrane carrier does not have to be continuous above at the base element, since in the embodiment of the membrane carrier with fingers and with an anchor between the fingers that is not configured to the outlet the cross section in the outlet includes plural fingers that are separate from each other which however are all part of the membrane carrier.

Thus it is advantageous according to the invention to also configure the width of the bulge of the flow cavity between the fingers in a uniform manner. This width however is in a range between 3 mm and 8 mm depending on operating conditions and solid content of the liquid to be filtered. For a smaller solid content and smaller solid particles also smaller dimensions can be useful for increasing packaging density under the condition that a sufficient amount of liquid to be filtered can flow through the flow cavity.

In order to make the flow through of the base element even it is advantageous that the at least one flow cavity in at least one of the horizontal sections forms at least one flow channel which has a uniform width over more than 80% of its length. Since rounding outer edges of the membrane carrier at locations of the bulges is advantageous for flow reasons the width of the flow channel at these locations deviates slightly from the uniform width.

In the embodiment of the membrane filter according to the invention it is advantageous that the membrane carrier has a downward tapering cross section in the horizontal sectional views This generates slanted flow leading edges at the membrane carrier where contaminants in the liquid to be filtered like e.g. hair or fibrous compounds leaves or coarser particles can slide off the bevels are thus configured so that the recited contaminants are deflected at the membrane carrier in outward direction into the flow cavity. This can be visualized with reference to the fingers. When fibrous compounds are applied to the flow leading edge of the finger when flowing a finger at the membrane carrier from below then the fibrous compounds will slide to the end of the finger due to the slanted configuration of the flow edge of the fingers and will then slide from the finger into the flow channel and will be flushed out of the module. Horizontal exposed flow leading edges where contaminants can easily lodge are substantially prevented by the configuration of the membrane carrier with a downward tapering horizontal cross sectional surface.

In an advantageous embodiment of the membrane filter the base element includes the gas inlet for letting the gas in the base element. The gas inlet is thus arranged below the membrane carrier. It is advantageous when the gas inlet is arranged directly below the membrane carrier because this minimizes a blow in depth of the gas which has a favorable influence on the energy requirement for the gassing.

Membrane filters known in the art include for example a vertically oriented mixing chamber for generating a gas liquid mix. This however has the disadvantage that it increases a blew in depth of the gas and thus energy requirements. For a water depth of 2 meters an increased blow in depth of 20 cm due to a mixing chamber already means a 10% higher energy requirement, WO 2008/144 826A1 describes a system of this type with a vertically extending mixing chamber for mixing gas and liquid.

Alternatively the gas inlet lets gas into the base element from below without being part of the base element itself.

It is advantageous for using the membrane filter according to the invention for waste water treatment in membrane bioreactors that the hollow fiber membranes are individually closed on top and freely float in the flow of the liquid to be filtered with their upper end. Thus contaminants like in particular hair or fibrous compounds can be flushed out of the membrane filter even when they have wrapped around the hollow fiber membranes when the filter is being flowed through.

In this embodiment of the membrane filter according to the invention with hollow fiber membranes that are only attached in a bottom in the membrane carrier of the base element the base element includes a permeate collecting cavity which is connected with the lumens of the hollow fiber membranes and the permeate outlet for flowing the permeate out of the membrane filter. In this case it is furthermore advantageously that the tube with close circumference extends at least up to the upper end of the hollow fiber membranes. Advantageously a membrane filter according to the invention includes a tube which extends above the upper end of the hollow fiber membranes. This provides that vertical flow components prevail in the upper portion of the hollow fiber membranes which facilitates in particular a stripping or flushing of contaminants from the filter.

For less bending stiff hollow fiber membranes it is advantageous when the membrane filter according to the invention includes a head element in addition to the base element in which head element the hollow fiber membranes are attached on top. In a membrane filter of this type according to the invention furthermore the head element can include a permeate collecting cavity connected with the lumen of the hollow fiber membrane and a permeate outlet. Thus either only the head element or additionally also the base element can include a permeate collecting cavity and a permeate outlet. The embodiment of a membrane filter according to the invention with a respective permeate collecting cavity and a respective permeate outlet in the head element and in the base element is more complex from a configuration point of view and therefore only useful in a case where the length or the lumen diameter of the hollow fiber membranes limit draining the generated permeate due to the pressure drop in the lumen. Draining the permeate on both sides of the hollow fiber membranes tolerates a greater length of the hollow fiber membranes and thus a smaller diameter of the lumen of the hollow fiber membranes which implements higher packaging densities in the membrane filter.

In the embodiment of the membrane filter according to the invention with a base element and a head element it is advantageous when the head element has a membrane carrier with a similar cross section like the base element in an outlet.

In the embodiment of the membrane filter according to the invention with a head element it is useful to purge contaminants from the liquid to a large extent before letting it into the membrane filter which in case of membrane bioreactors is typically achieved by fine sifting sludge in order to minimize a lodging of contaminants between the hollow fiber membranes below the head element. For the same reason it is useful in this embodiment of the membrane filter according to the invention that the tube is not run to the head element with a closed circumference, which however is only possible for submerged operations of the membrane filter.

The simplest version of a membrane filter according to the invention in which the tube is not run to the head element leaves the distance between the upper end of the tube and the head element open. Thus the liquid can flow out of the membrane filter before reaching the head element which reduces the clogging propensity of the head element. In the configuration of the membrane filter according to the invention it is advantageous when the tube with close circumference which is not run to the head element of the membrane filter is adjoined on top by a tube insert with circumferential openings. The openings have the purpose to let a portion of the liquid flow out of the membrane filter already before reaching the head element. Also this reduces an adherence of hair and fiber compounds below the head element. It is advantageous to run the tube with clos circumference at least up to half the distance between the base element and the head element in order to use the mammoth pumping effect and to generate a flow that extends substantially parallel to the hollow fiber membranes. This avoids furthermore that liquid to be filtered flows from an outside over the circumference of the tube which would lead to hydrodynamic ally unfavorable transversal flows in the membrane filter. The tube and the tube insert, can be made from one component.

Due to the mammoth pumping effect a high flow velocity is already generated in the base element of the membrane filter according to the invention. The combination of the flow of the liquid with the gas flow is already advantageous to counter act a blocking of the base element. On the other hand side there is a challenge to distribute the gas evenly over the cross section of the flow cavity in the base element. Namely due to the high flow velocity of the liquid to be filtered gas bubbles climb directly at the location there introduction into the liquid in a vertically upward direction with only minor mixing propensity in horizontal direction.

Membrane filters that are known in the art which use the mammoth pumping effect facilitate a distribution of the gas in the liquid through a vertically oriented mixing chamber or inflow zone in which the liquid can also spread in horizontal direction over the flow cross section. U.S. Pat. No. 5,482, 625 describes a flow end zone of this type in plate modules with a lateral limitation according to the tube of the instant invention. The vertically extending inflow zones or mixing chambers however have the disadvantage described supra of higher energy requirements for the gassing since the gas is introduced with a higher blow in depth.

The even distribution of the gas over the cross section of the flow cavity in the base element is facilitated for an embodiment of the membrane filter according to the invention by a gas distribution system for introducing gas at plural locations below the membrane carrier into the liquid.

For a membrane filter according to the invention the membrane carrier closes the base element besides the flow cavity not only for the flow through of the liquid but also for the flow through of the gas entirely.

Improving upon the known method it is proposed according to the invention that the gas flows through the gas inlet into the at least one flow cavity and thereafter the gas flows through the base element together with the liquid in the at least one flow cavity between the shell and the membrane carrier and through the outlet into the tube, wherein the at least one flow cavity includes bulges protruding into the membrane carrier according to the invention. A method of this type according to the invention is performed in a membrane filter according to the invention and is also characterized by the advantages recited therein.

In an advantageous embodiment of the method according to the invention the liquid and the gas flow around the membrane carrier in at least one of the horizontal sectional view of the membrane carrier in its entirety. Each connection between the membrane carrier and the shell which are designated as anchor locations in the membrane filter according to the invention bear the risk that particles or solids of the liquid deposit in the flow shadow above the connecting location and lead to blockages in the portion of the hollow fiber membranes arranged there above. This is the case in particular when the anchor locations extends vertically up to the outlet of the base element in their full width. This risk can be avoided in that the anchor locations taper in vertical direction upward and then terminate already upstream of the outlet of the base element. In the portion of the taper the two phase flow including gas and liquid can expand into the flow shadow of the anchoring locations and can thus completely flow around the membrane carrier above the anchoring locations.

In order to execute a method according to the invention the membrane filter can be submerged in the liquid. The membrane filter is then enveloped by the liquid and due to the mammoth pumping effect of the gas introduced into the base element and rising in the membrane filter the liquid is suctioned from below into the base element and flows through the filter unit together with the gas before both flow out of the filter unit on top.

According to method according to the invention the liquid can be supplied to the base element by a first liquid conductor and can be run out on top from the membrane filter by a second liquid conductor wherein the second liquid conductor is connected above the hollow fiber membranes to a tube which envelops the hollow fiber membranes and adjoins at a top of the base element. This variant of operating a filter unit according to the invention is also designated as dry set up operations.

According to the method according to the invention due to the tube adjoining at a top of the shell of the base element the introduced gas generates a strong mammoth pumping effect in the membrane filter according to the invention which generates in particular also a high flow velocity in the flow cavity of the base element. This is an additional drive force in order to flush out deposits and starting blockages in the flow cavity self acting.

When implementing larger filter units plural membrane filters according to the invention can be mounted parallel adjacent to each other on a common frame. Thus the permeate outlets of the individual membrane filters are connected with tubular conduits which are used for running the permeate generated from the membrane filters. Also the gas inlets are connected with tubular conduits which are used for feeding the gas into the membrane filters. Thus the gas feed conduits are individually configured with throttles in order to balance the air supply to the individual membrane filters. Thus it is advantageous to position the throttles in the gas feed conduits above the liquid surface in order to prevent a flooding of the throttle cross sections also when the filter is switched off and thus to exclude a clogging of the throttles by solid components of the liquid.

BRIEF DESCRIPTION OF THE DRAWINGS

The invention is subsequently described based on embodiments with reference to drawing figures, wherein:

FIGS. 2A-2C illustrate flow conditions in the first membrane filter.

FIGS. 7A-7D illustrate additional membrane filters according to the invention;

DETAILED DESCRIPTION OF THE INVENTION

Figure 1A:
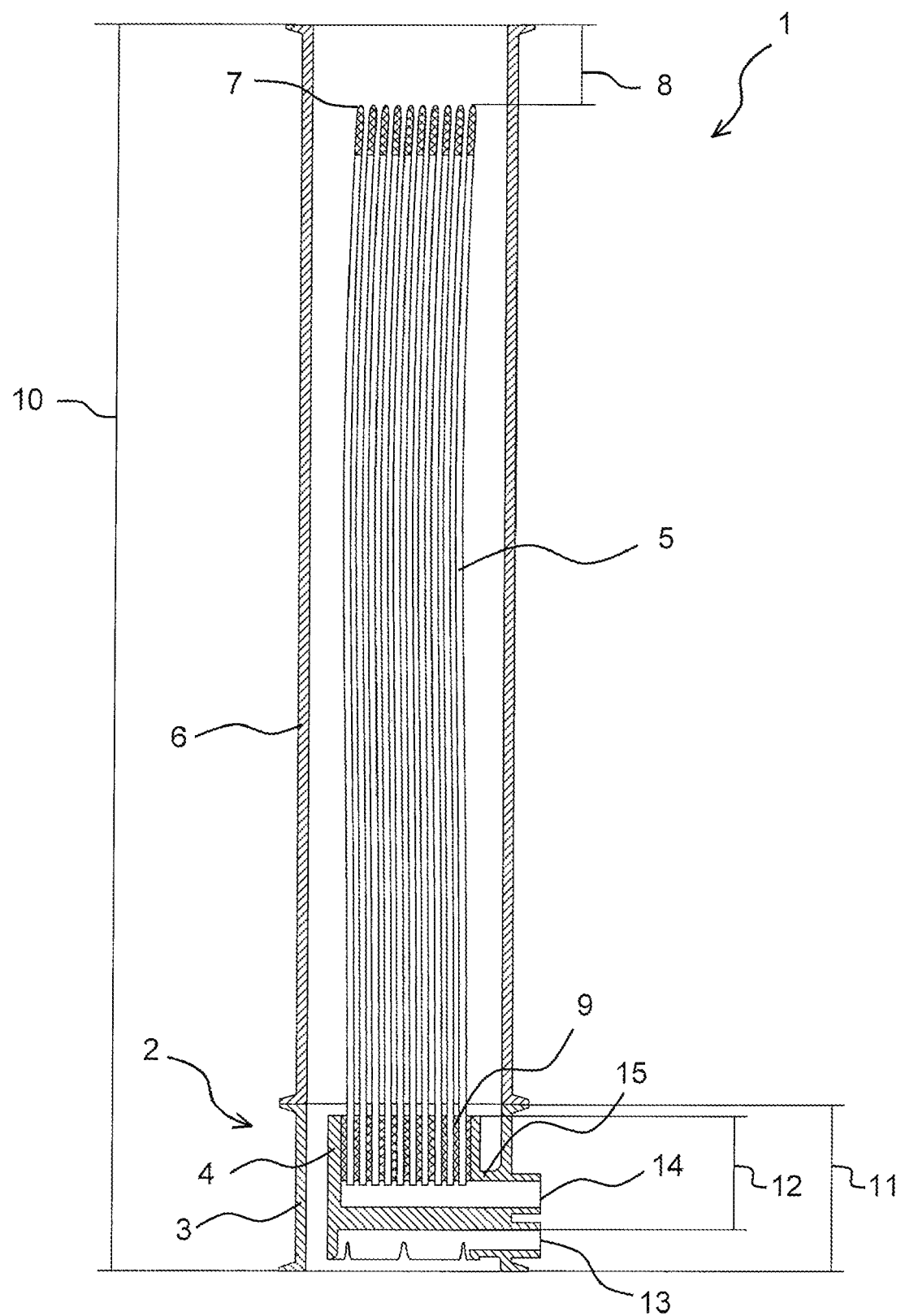
FIGS. 1A-1E illustrate a first embodiment of the membrane filter (total sectional view, partial sectional views and views of the base element)
Figure 1B:
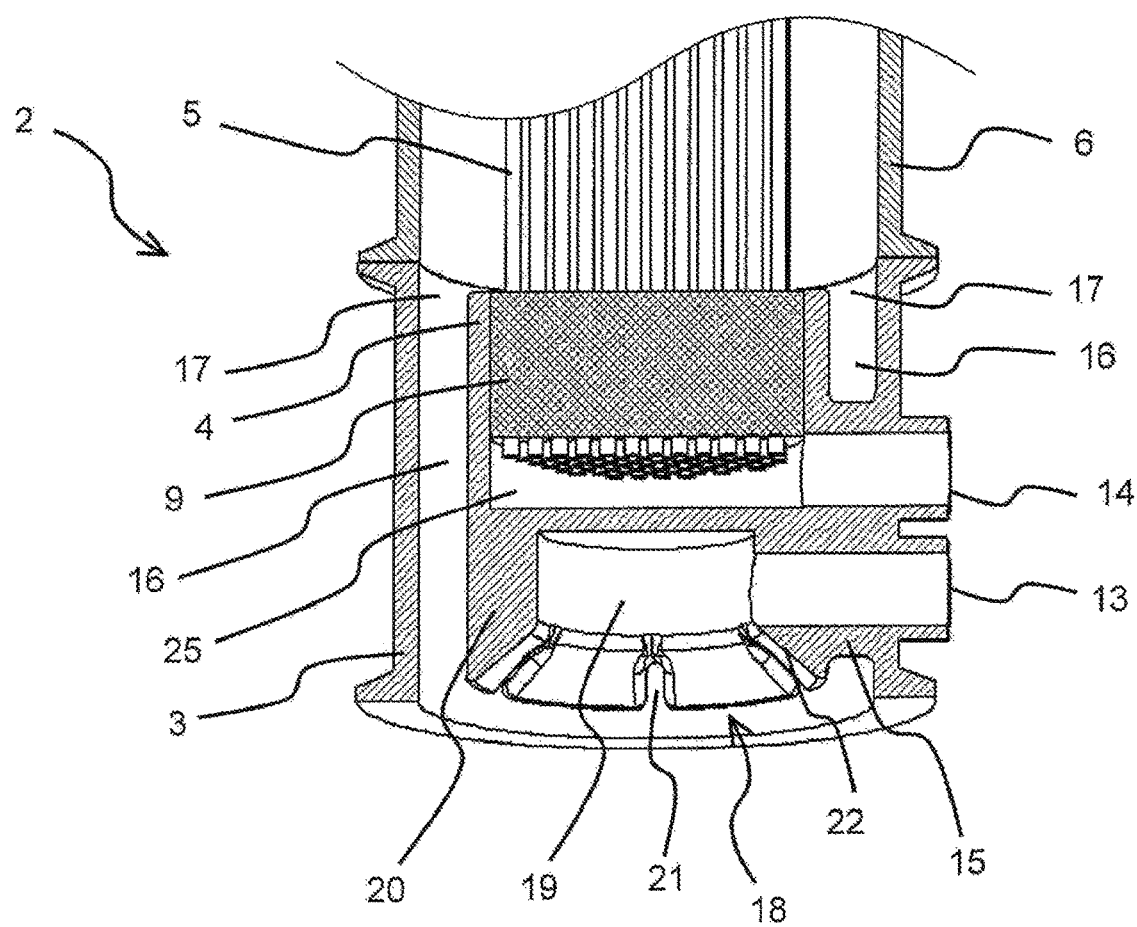
Figure 1C:
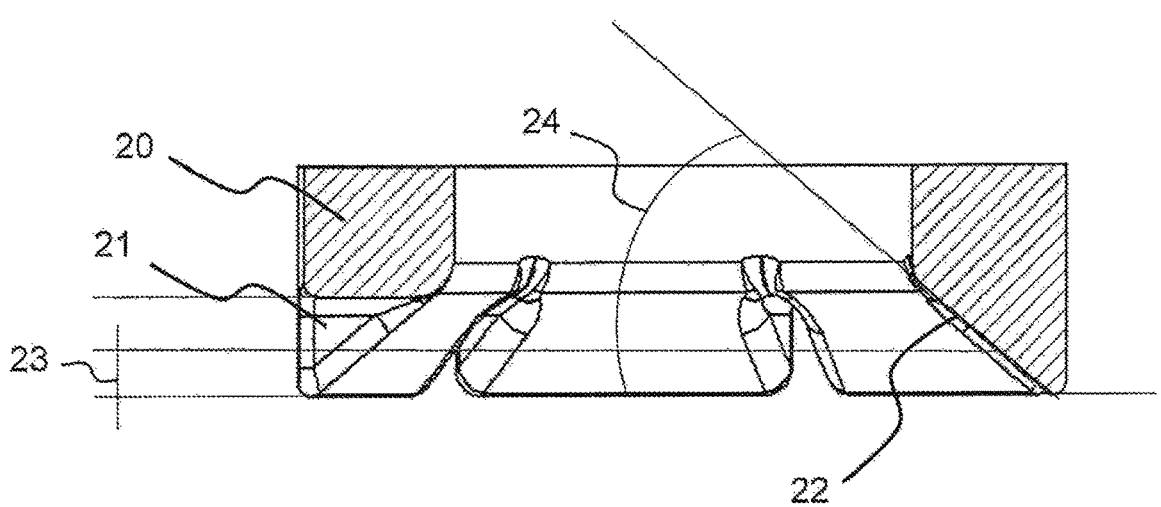

The drawing figures are not to scale. All non stated details of subsequently described membrane filters according to the invention are identical with embodiments of previously described membrane filters according to the invention.

FIGS. 1A-1E illustrate sectional views and views of a first membrane filter 1. This membrane filter includes a base element 2 with a shell 3 and a membrane carrier 4 arranged therein in which hollow fiber membrane 5 are arranged on top. A cylindrical tube 6 adjoins the shell 3 of the base element 2 on top of the base element 2.

The hollow fiber membranes 5 are fabric reinforced and have an external diameter of 2.5 mm. They are individually closed at an upper end 7. The tube 6 extends beyond the upper end 7 by a length of 8 cm to 10 cm. The hollow fiber membranes 5 are cast in in a sealing manner in the membrane carrier 4 by a resin layer 9, wherein lumens of the hollow fiber membrane 5 remain open.

The membrane filter 1 has a height 10 of 200 cm the base element 2 has a height 11 of 12 cm and the membrane carrier 4 has a height 12 of 11 cm. The base element 2 and the tube 6 both have an external diameter of 75 mm. The tube 6 has an internal diameter of 68 mm. The base element 2 furthermore includes a gas inlet 13 and a permeate outlet 14.

The membrane carrier 4 is connected with the shell 3, through an anchor location 15. The base element 2 includes a flow cavity 16 between the shell 3 and the main membrane carrier 4 wherein the flow cavity is configured as an annular gap with a width of 9 mm, envelops the membrane carrier 4 and is only interrupted by the anchor location 15. The flow cavity 16 is adjacent in each horizontal sectional view to the shell 3 and also to the membrane carrier 4.

The flow cavity 16 is limited in vertical direction by the overlap portion of the height 11 of the base element 2 and the height 12 of the membrane carrier 4. The base element 2 is open in downward direction and capable of flow through. The flow cavity 16 includes an outlet 17 on top into the tube 6.

The gas inlet 13 is connected with a gas distribution system 18 configured on a bottom side of the membrane carrier 4 wherein the gas distribution system includes a tub 19 that is open in downward direction and closed in upward direction, wherein the tub includes a wall 20 with downward open vertical slots 21. The tub 19 includes an inner edge 22 respectively in a center between adjacent slots 21 in a sectional view that is vertical and orthogonal to the wall 20, wherein the inner edge 22 is a slanted edge over an entire height of the slots 21 wherein an angle 24 of the slanted edge 22 is 40° relative to horizontal. Alternatively the inner edge 22 in a portion of a lower half 23 of the slots 21 can have an angle 24 relative to horizontal that is less than 60° in any point.

The base element 2 furthermore includes a permeate collecting cavity 25 into which the lumens of the hollow fiber membrane lead. The permeate collecting cavity 25 is connected with the permeate outlet 14 of the base element 2.

Figure 1D:
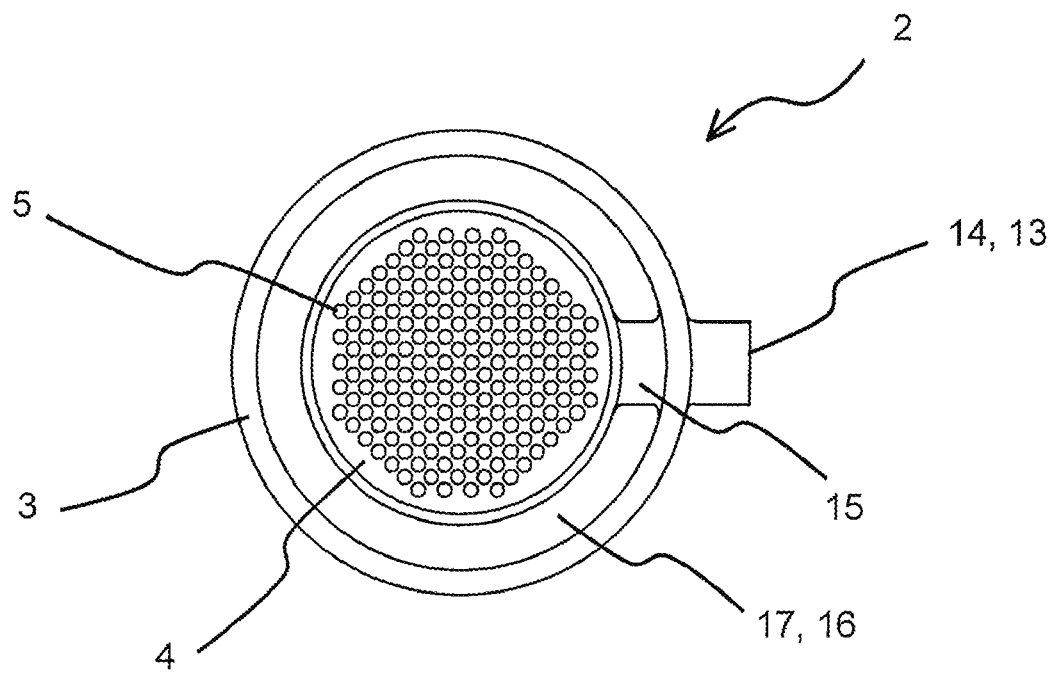
Figure 1E:
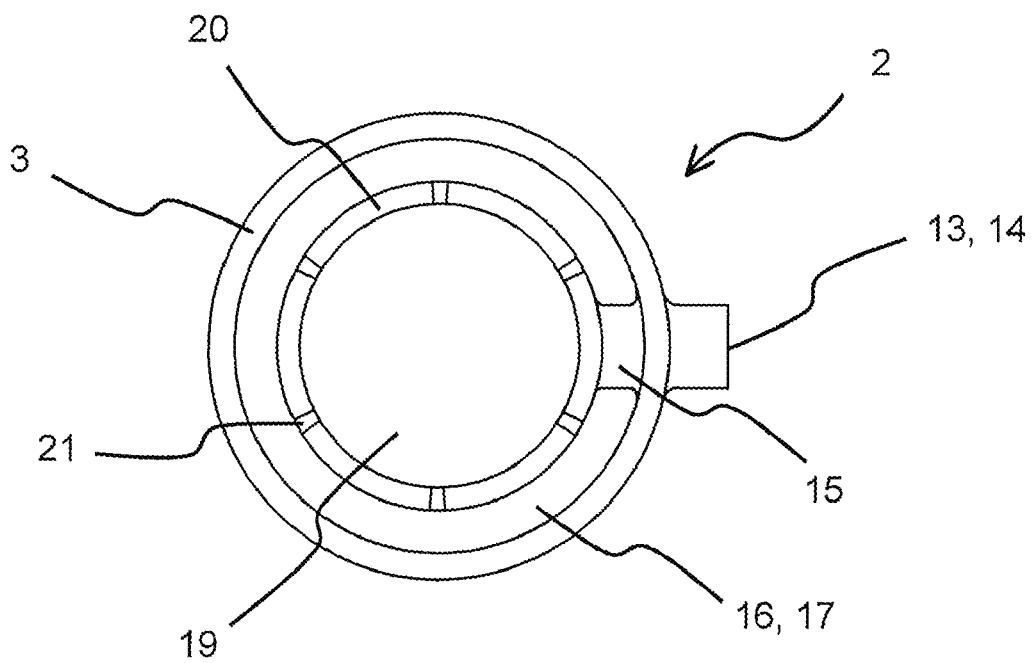

FIG. 1D illustrates a top view of the base element 2 with the hollow fiber membranes 5 without the tube 6. The number of the illustrated hollow fiber membranes 5 does not correspond to an actual number of the actual hollow fiber membranes 5. FIG. 1E illustrates a view of the base element 2 from below. The number of slots 21 is 6. The slots are evenly distributed over a circumference of the top 19 in the wall 20 of the top 19.

The permeate outlet 14 and the gas inlet 13 are arranged in a radially outward extension of the anchor location 15.

FIGS. 2A-2C illustrate the flow conditions in the base element 2 and in the lower portion of the tube 6 of the first membrane filter 1 during filtering operations.

Thus, FIG. 2A illustrates a first vertical sectional view of the lower portion of the membrane filter 1, wherein the sectional view also extends through the anchoring location 15.

A gas 26 is introduced into the base element 2 and the flow cavity 16 through the gas inlet 13 during operations of the membrane filter 1 thus the gas 26 flows through the gas inlet 13 initially into the tub 19. The gas 25 fills the tub 19 up to a portion of the height of the slots 21 and forms a gas cushion 27 in the tub 19. The gas 26 also fills the slots 21 up to the level of the gas cushion 27 and eventually flows laterally through the portion of the slots 21 that are filled with the gas 26 out of the tube 19 or out of the gas cushion 27 and thus into a liquid 28 that is to be filtered.

Besides the flow cavity 16 the membrane carrier 4 closes the base element 2 completely for the flow through of the liquid 28 and of the gas 26, this means besides the flow cavity 16 there are no additional pass through openings for the gas 26 and the liquid 28 in the base element 2.

Above the base element 2 there are no additional installations in the tube 6 besides the hollow fiber membranes 5. Therefore the hollow fiber membranes 5 float freely in the liquid 28 without impediment and are only fixated at their bases. Thus also hair, fibrous compounds or other contaminants from the liquid 28 cannot be lodged in this portion.

During lateral flow through the slots 21 the gas 26 generates a radially outward oriented liquid flow that is parallel to the lateral gas flow at a face boundary surface below the gas cushion 27. The liquid flows between respective adjacent slots 21 against and inner edge 22 of the wall 20 which has an angle relative to horizontal of less than 60° in each point in the portion of the slots. At this slanted inner edge hair and fibrous compounds included in the liquid 28 to be filtered are stripped off through the outward oriented gas flow and liquid flow which reduces a risk of these contaminants lodging in the membrane filter 1.

After flowing through the slots 21 the gas 26 rises through its buoyancy in the membrane filter 1 and generates an upward flow of the liquid 28. This liquid flow is suctioned into the membrane filter only from below. The gas 26 and the liquid 28 flow through the flow cavity 16 of the base element 2 and jointly flow through the outlet 17 into the tube 6 and above at the tube 6 out of the membrane filter 1.

The strong shear force effect of the two phase flow including the liquid 28 and the gas 26 which rises through the mammoth pumping effect in the membrane filter 1. The membrane carrier 4 is flushed on the outside in the flow cavity 16 of the base element 2 and the hollow fiber membranes 5 are flushed on the outside in the tube 6 and thus coatings and deposits are flushed off from the surfaces of the membrane carrier 4 and of the hollow fiber membranes 5 and are carried out the membrane filter 1.

Between the outside of the hollow fiber membranes 5 and their lumens there is a pressure differential based on which a liquid permeate 29 is filtered out the liquid 28 and flows into the lumens of the hollow fiber membranes 5. The permeate 29 is collected from the lumens of the hollow fiber membranes 5 and then flows through the permeate outlet 14 out of the membrane filter 1.

Through the anchor location 15 the gas 26 is supplied and the permeate 29 that is filtered in the membrane filter 1 is drained.

The gas inlet 13 is flow connected with the flow cavity 16 within the base element 2, so that the base element 2 is flowable from the gas inlet 13 through the tub 19, through the slots 21 and through the flow cavity 16 to the outlet 17.

FIG. 2B illustrates an additional sectional view of the lower portion of the membrane filter 1 which sectional view however is turned by 90°. Thus the anchor location 15 is not sectioned but 2 of the slots 21. The lateral outflow of the gas 26 through the slots 21 from the tub 19 or from the gas cushion 27 are visible. Additionally this sectional view shows the permeate collecting cavity 25 but does not show the permeate outlet 14.

FIG. 2C Illustrates another sectional view of the lower portion of the first membrane filter 1 which in this case only sections the shell 3 and otherwise extends through the flow cavity 16 so that the outside of the membrane carrier 4 becomes visible. Thus the lateral outflow of the gas 26 from the slots 21 is visible.

Figure 3:
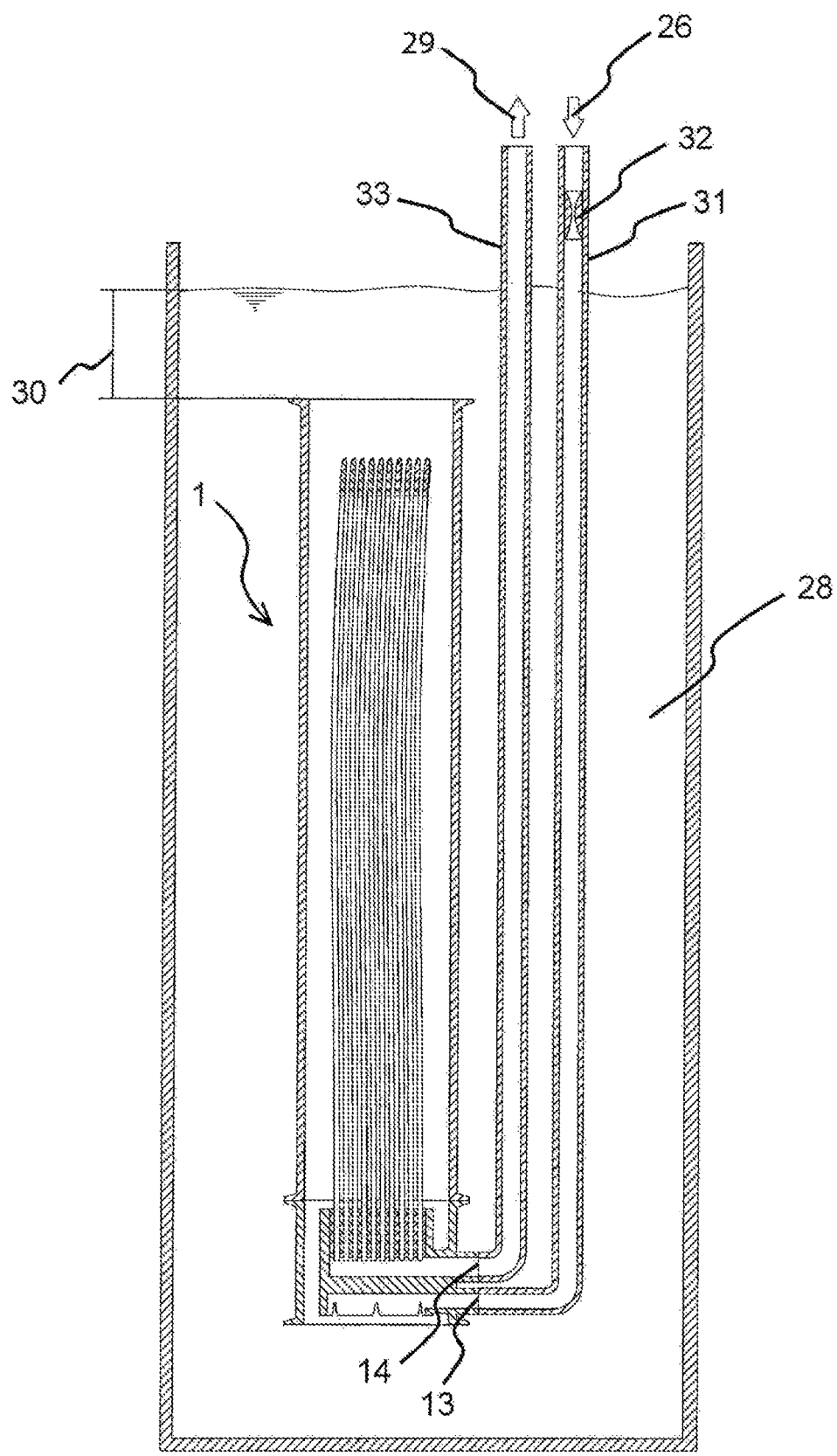
FIG. 3 illustrates the first membrane filter in submerged operations.

FIG. 3 illustrates the first membrane filter 2 is submerged operations. Thus gas bubbles in the liquid 28 are not illustrated. Thus the membrane filter 1 is submerged in a tank with the liquid 28 to be filtered so that a liquid overhang 30 of 15 cm remains above the membrane filter 1 to the surface of the liquid 28. Through a gas feed conductor 31 the gas 25 is run from above the surface of the liquid 28 to the gas inlet 13. A throttle 32 is installed in the gas feed conduit 31. The throttle is illustrated at this location in an exemplary manner and is only required when plural membrane filters 1 are operated in parallel and supplied with gas 26 simultaneously. The throttles 32 in the gas feed conduits 31 are used for balancing volumes of gas 26 flowing into the individual membrane filters 1. The throttle 32 is arranged above the surface of the liquid to be filtered. Through a permeate conductor 33 the permeate 24 generated in the membrane filter 1 is drained by the permeate outlet 14.

Figure 4:
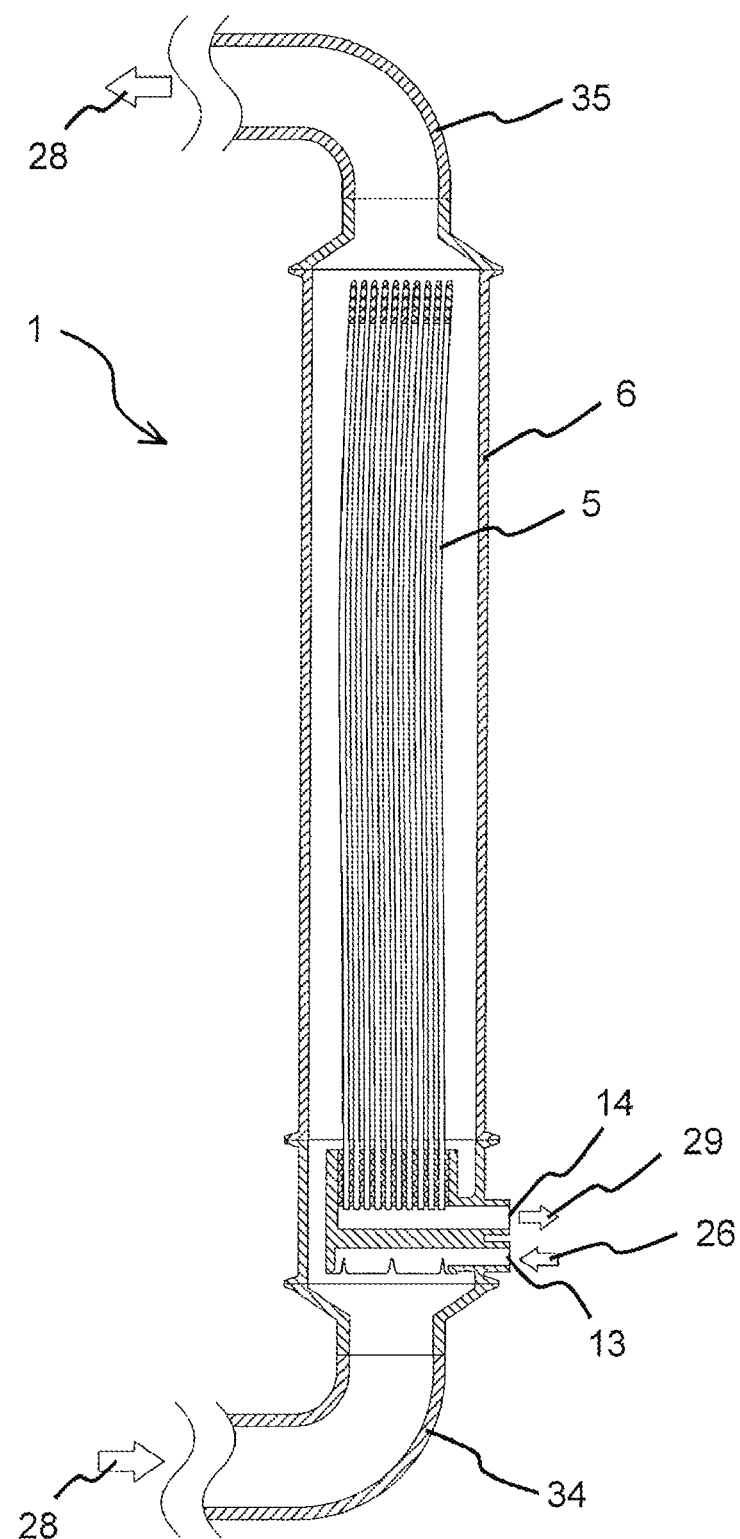
FIG. 4 illustrates the first membrane filter in dry set up operations.

FIG. 4 illustrates the first membrane filter 1 in dry set up operation. Gas bubbles in the liquid 28 to be filtered are thus not illustrated. The liquid 28 is supplied to the membrane filter 1 through a first liquid conduit 34. A permeate 29 if filtered from the liquid 28 and drains through the permeate outlet 14. Through the gas inlet 13 the gas 26 is supplied. Through a second liquid conduit 35 the gas 26 and the liquid 28 minus the permeate 29 are drained. The second liquid conduit 35 is connected at a top of the tube 6 wherein the tube extends beyond the hollow fiber membranes 5.

FIGS. 5A-5G illustrate views and various sectional views of a second membrane filter 36 according to the invention.

Figure 5A:
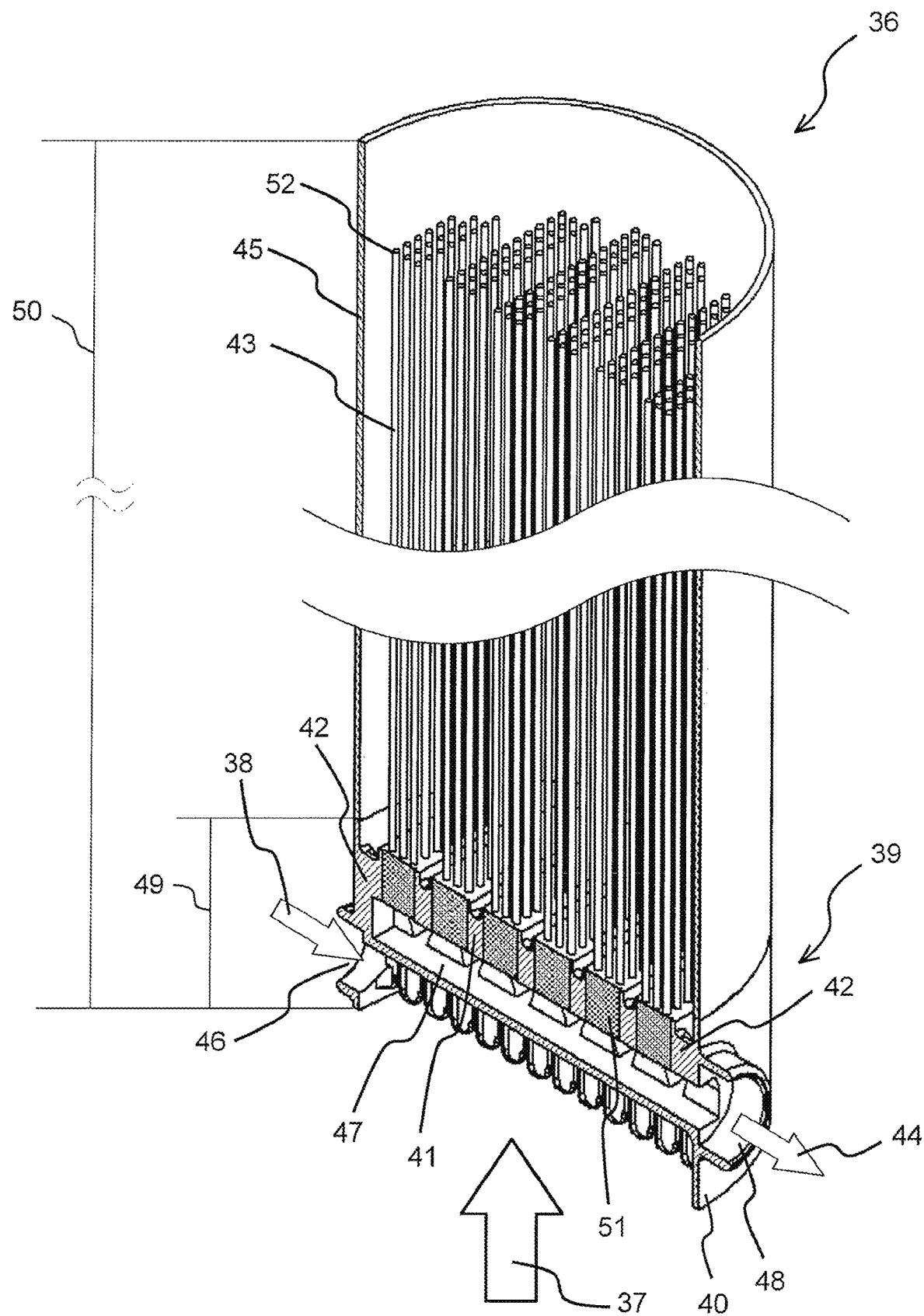
FIGS. 5A-5I illustrate details of a second embodiment of the membrane filter according to the invention.

FIG. 5A illustrates a longitudinal sectional view of the second membrane filter 36. The second membrane filter 36 includes a base element 39 that is open in downward direction towards a liquid 37 to be filtered and that is flowable by a gas 38 and a liquid 37 wherein the base element includes a tubular shelf 40 and precisely one membrane carrier 41 arranged therein, wherein the membrane carrier 41 is connected with the shell 40 through 2 anchor locations 42. Hollow fiber membranes 43 are attached on top in the membrane carrier 41 wherein the hollow fiber membranes respectively include a lumen into which a liquid permeate 44 from the liquid 37 is filterable. Additionally the membrane filter 36 includes a circumferentially closed tube 45 which envelops the hollow fiber membranes 43 and adjoins the shell 40 or the base element 49 at a top and a gas inlet 45 for letting the gas 38 into the base element 39. The base element 39 includes a permeate collecting cavity 47 which is connected with the lumens of the hollow fiber membranes 43 collecting the permeate 44 from the hollow fiber membranes 43 and a permeate outlet 48 for draining the permeate 44 from the permeate collecting cavity 47.

The base element 31 has a height 49 of 12 cm and the membrane filter 36 has a height 50 of 212 cm. The hollow fiber membranes 43 are encased at a bottom in the membrane carrier 41 by a resin layer 51 against the liquid 37 to be filtered in a sealing manner, wherein the lumens of the hollow fiber membranes 43 remain open. The number of the illustrated hollow fiber membranes 43 does not correspond to the actual number of the hollow fiber membranes 43. The hollow fiber membranes 43 are individually closed on top and flowed freely on top in the liquid 37 to be filtered besides the lower fixation. The hollow fiber membranes 43 are completely enclosed by the tube 45. The tube 45 protrudes by 10 cm above the upper ends 52 of the hollow fiber membranes 43.

Figure 5B:
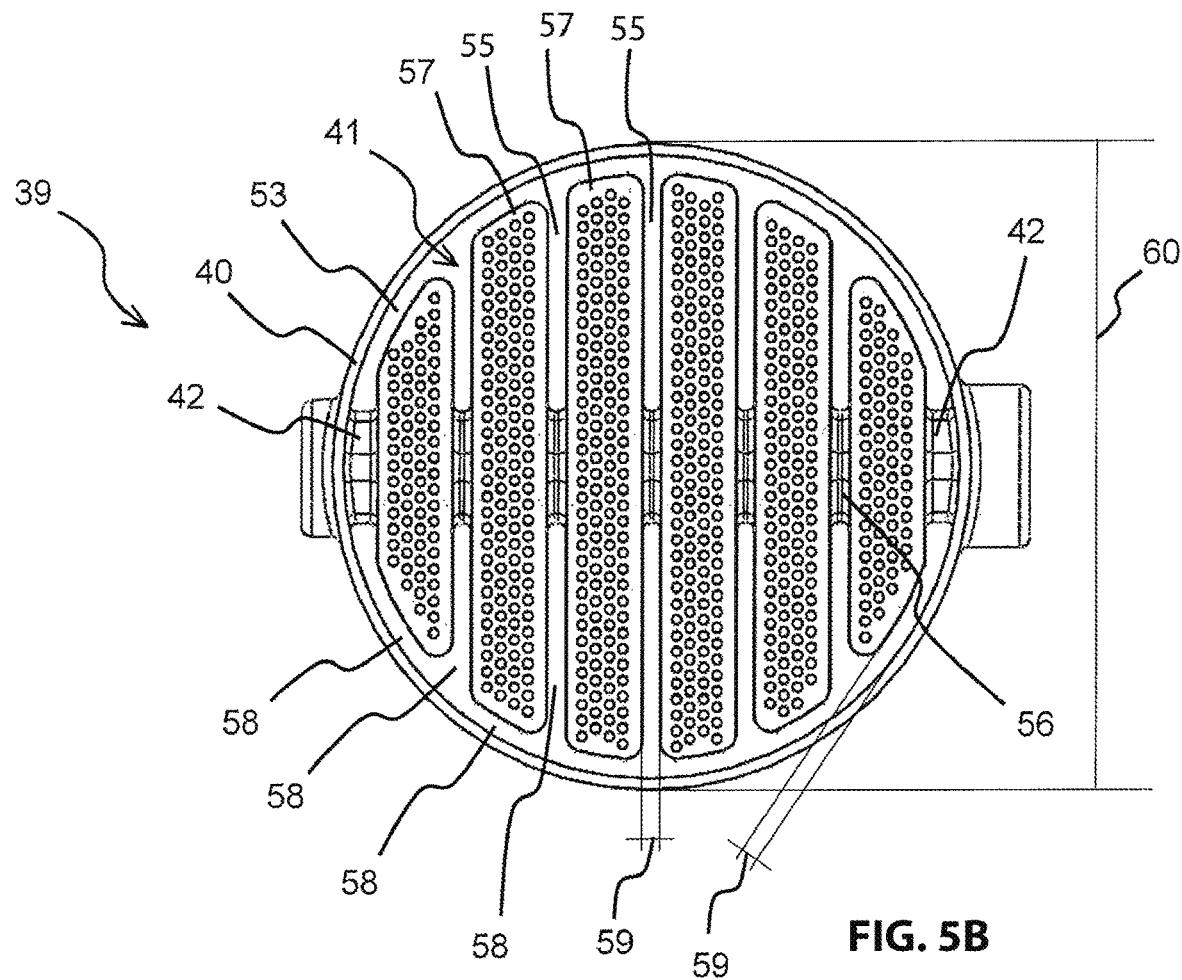
Figure 5C:
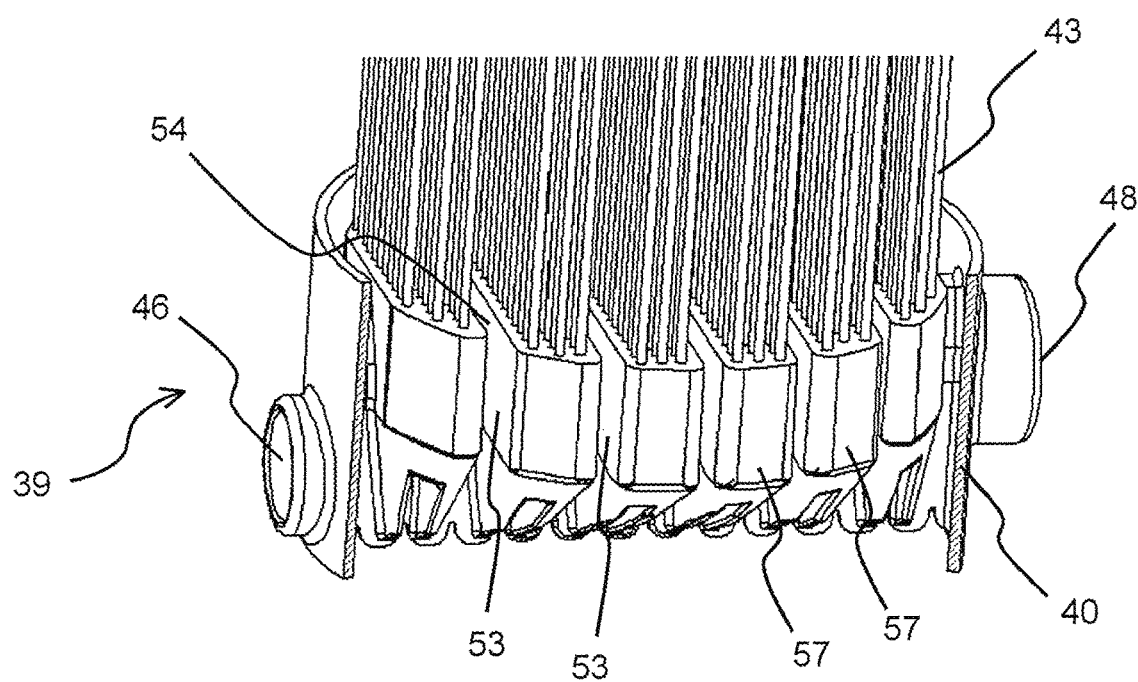

FIG. 5B illustrates a top view of the base element 39 of the second membrane filter 36 and FIG. 5C illustrates a perspective view with a cut up shell 40. Between the shell 40 and the membrane carrier 41 the base element 39 includes a downward open flow cavity 53 for flowing the liquid 37 to be filtered wherein the flow cavity includes an outlet 54 on top for letting the liquid 37 to be filtered out into the tube 45.

The flow cavity 53 has bulges 55 that protruded into the membrane carrier 41 up to an anchor 56 of the membrane carrier 41. Thus 6 fingers 57 are formed at the membrane carrier 41 wherein the 6 fingers are connected by the anchor 56 of the membrane carrier 41. The 2 anchors 42, are arranged in an extension of the anchor 56, wherein the gas inlet 46 runs through one anchor location and the permeate outlet 48 runs through the other anchor location. The two anchor locations 42 are the only connections of the membrane carrier 41 with the shell 40. Outfitting the membrane carrier 41 with the hollow fiber membranes 43 is performed in the second membrane filter 36 only in the portion of the fingers 57, wherein the portion between the fingers above the anchor 56 remains recessed for production reasons. The hollow fiber membranes 43 of the second membrane filter 36 are fabric reinforced and have an outer diameter of 2.5 mm.

In the portion of the anchor 56 there is a horizontal section in the base element 39 in which the flow cavity 53 forms two continuous flow channels 58 which have a uniform width 59 of 6 mm in the annular gap in the outer portion of the fingers 57. Also between the fingers 57 the flow channel 58 has the same width 59 of six mm. Since the edges of the fingers 57 are rounded for hydrodynamic reasons the 2 flow channels 58 have a slightly greater width than 6 mm at the edges of the fingers 57. Overall the 2 flow channels 58 have a uniform width of 6 mm on more than 80% of their length.

The flow cavity 53 in each horizontal section is adjacent to the shell 40 and also adjacent to the membrane carrier 41 and is only interrupted by the two anchor locations. The membrane carrier 41 closes the base element 39 completely besides the flow path 53, this means the base element 39 has no additional flow through channels besides the flow cavity 53 for the liquid 37 to be filtered for the gas 38.

The diameter 60 of the base element 39 of the second membrane filter 36 is approximately 208 mm.

Figure 5D:
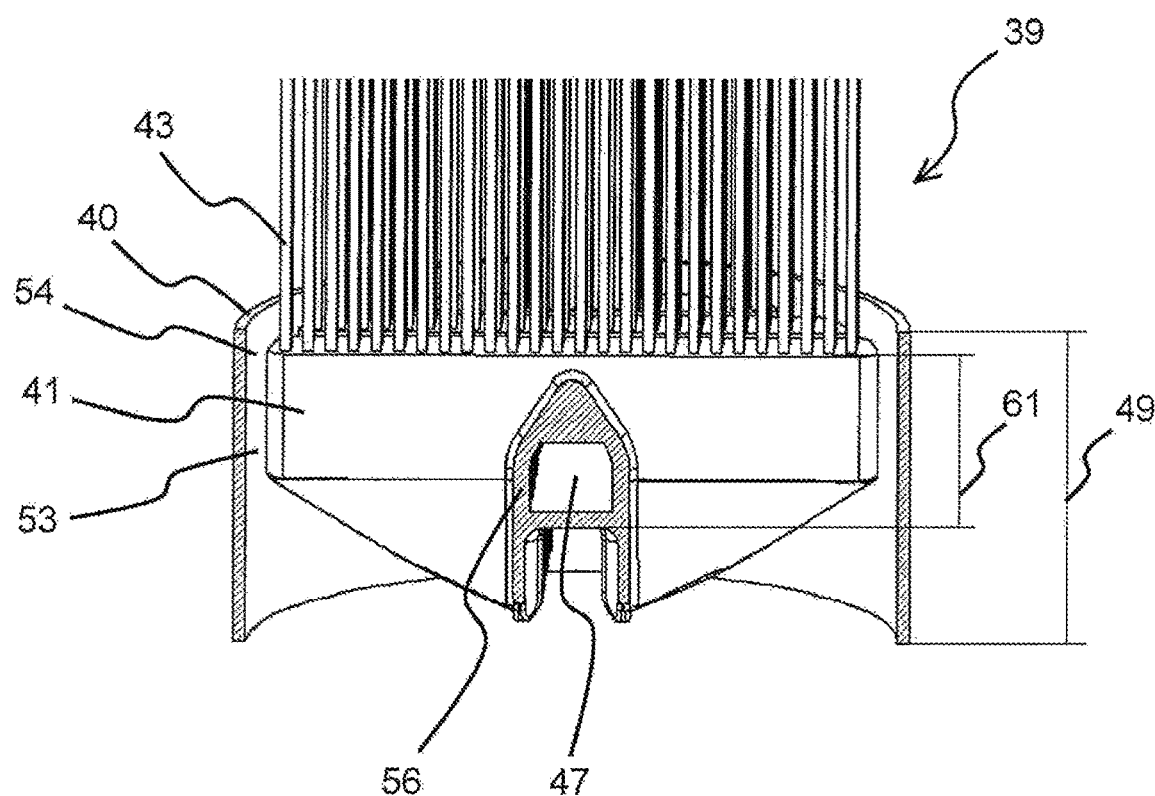

FIG. 5D illustrates a sectional view of the base element 38 of the second membrane filter 36 so that the anchor 56 is cut precisely in the flow cavity 53 between two fingers 57. Within the anchor 56 there is a portion of the permeate collecting cavity 47 The flow cavity 53 is defined in vertical direction by the overlap portion of the height 49 of the base element 39 and a height 61 of the membrane carrier 41. At the bottom side of the membrane carrier 41 a gas distribution system 62 is formed whose height remains unconsidered when defining the flow cavity 53. The flow cavity 53 terminates on top in the outlet 54.

Figure 5E:
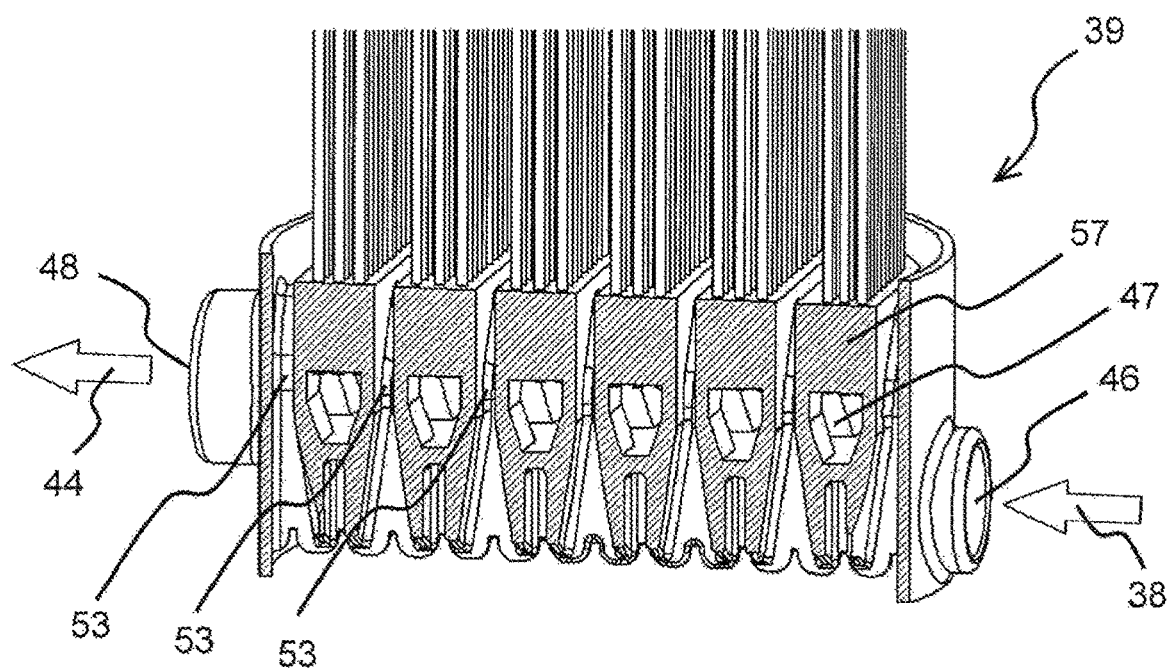

As evident from FIGS. 5D and 5E the fingers 57 are provided with a bevel on a bottom in both horizontal direction wherein the membrane carrier 41 has a horizontal cross sectional surface that decreases in the downward direction. Thus hair and fibrous compounds included in the liquid 57 to be filtered so not adhere to the fingers 57 but are stripped off along the bevel of the fingers 57 into the flow cavity 53, flushed through the flow cavity 53 and subsequently move into the portion of the hollow fiber membranes 43 in the tube 45. Since no other installations are provided in this portion besides the hollow fiber membranes 43 that are individually closed on top and at which hair or fibrous compounds can adhere and additionally since the hollow fiber membranes 43 are individually closed on top hair and fibrous compounds can be flushed freely in upward direction out of the membrane filter 36.

Figure 5H:
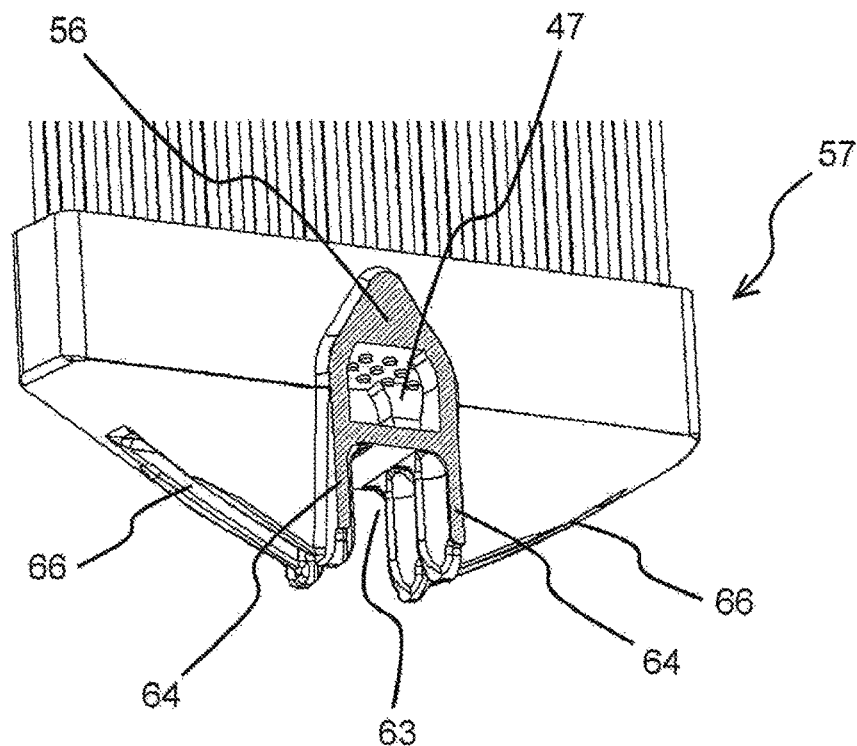
Figure 5I:
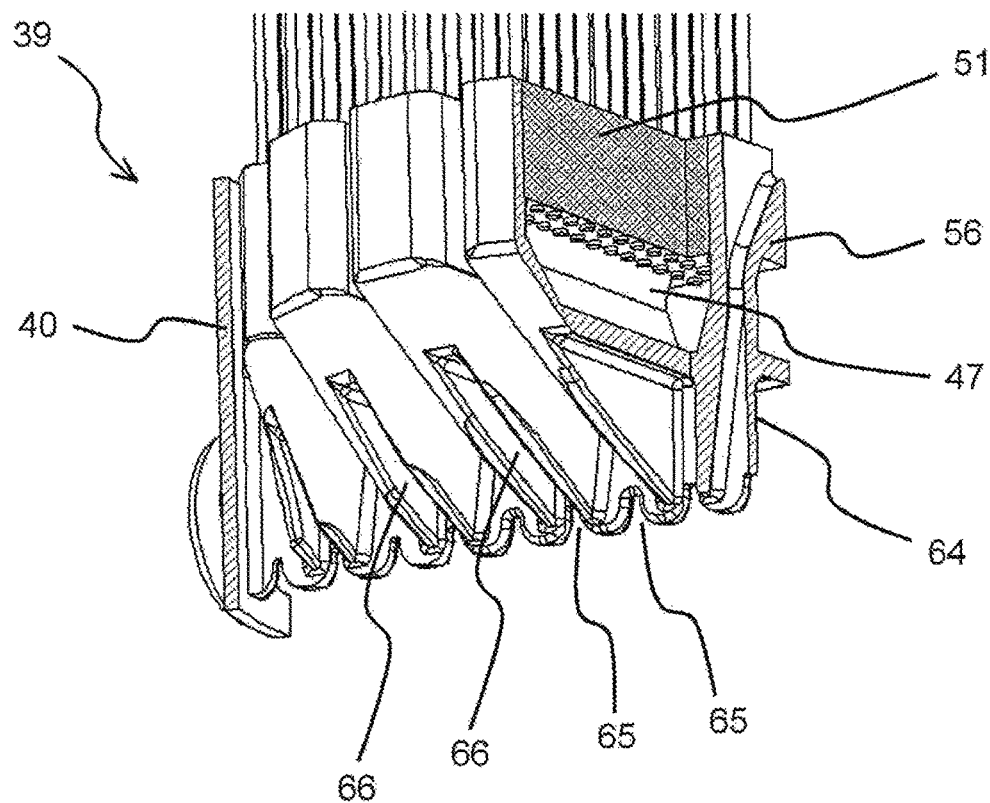
Figure 5A:
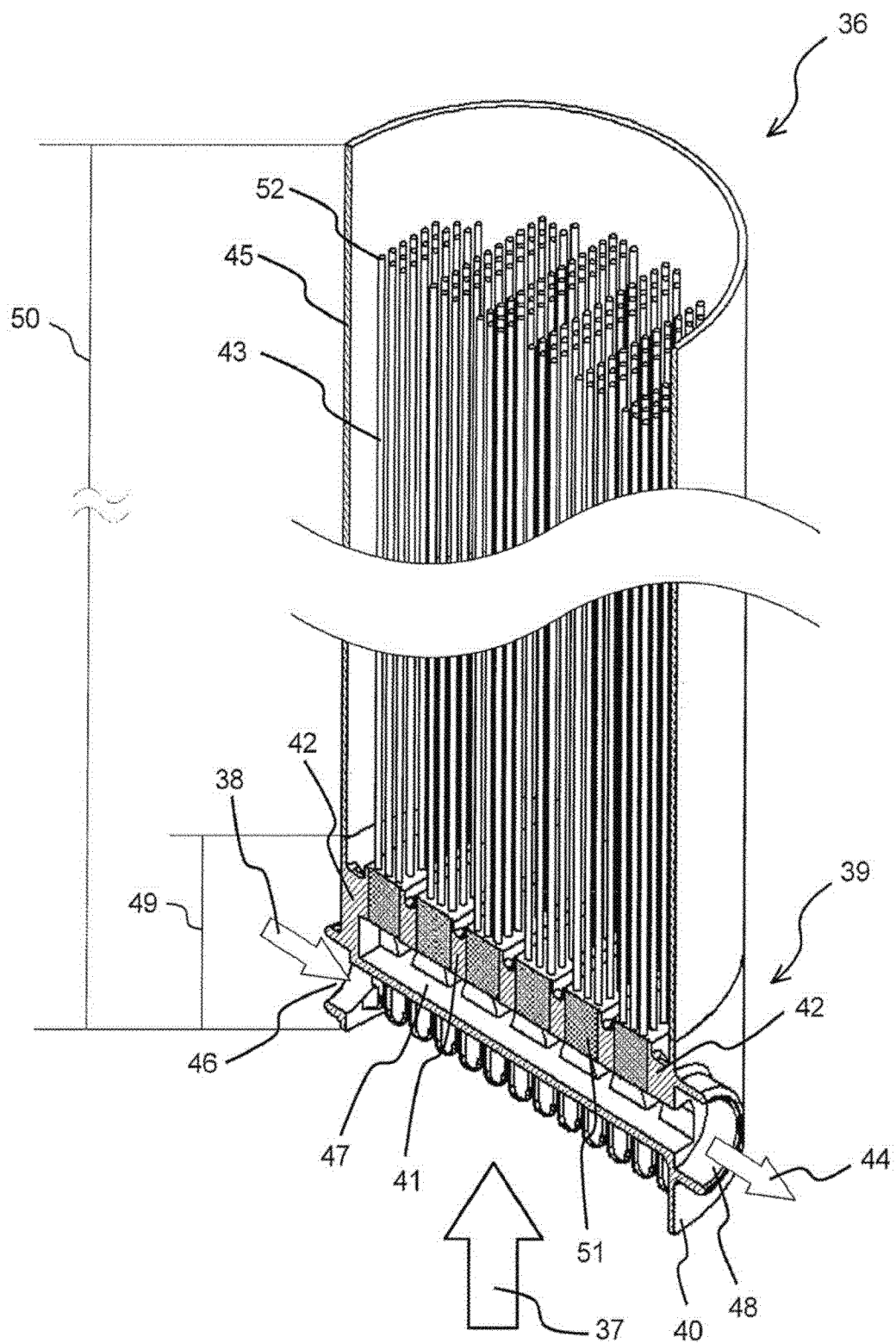
Figure 5B:
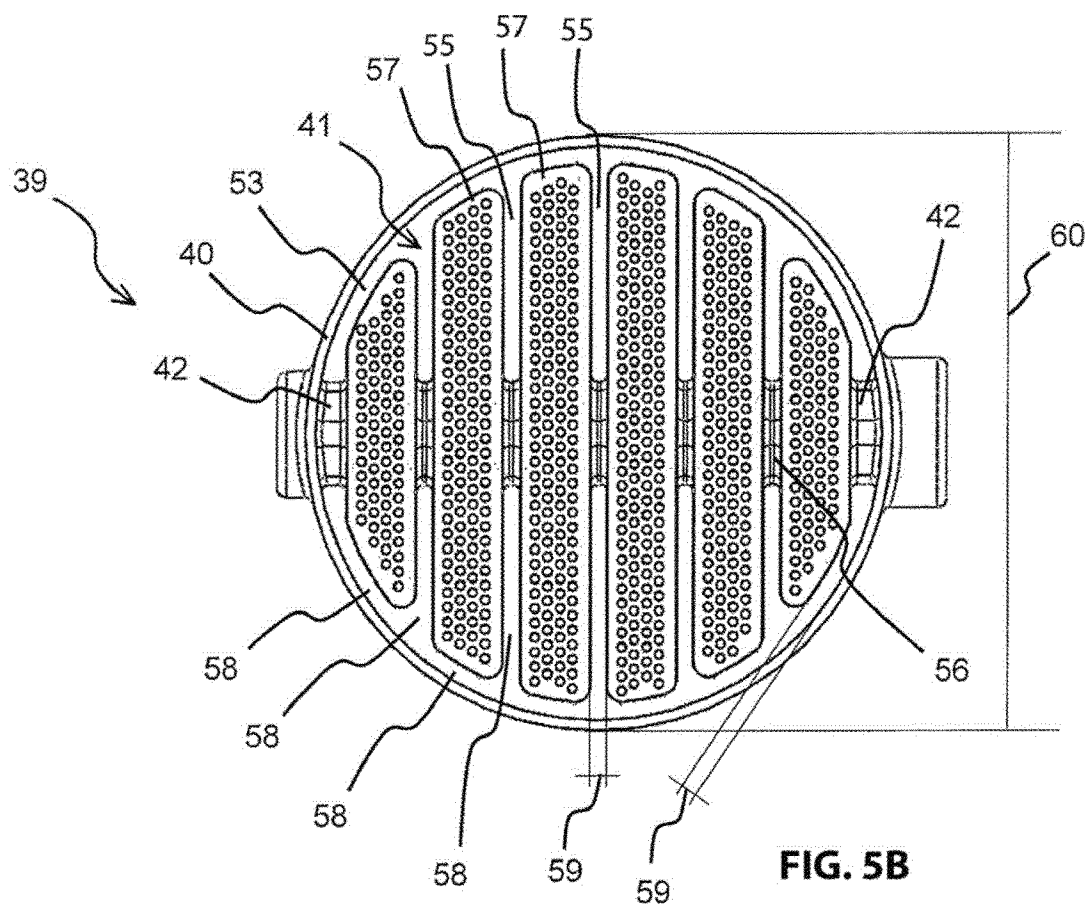
Figure 5C:
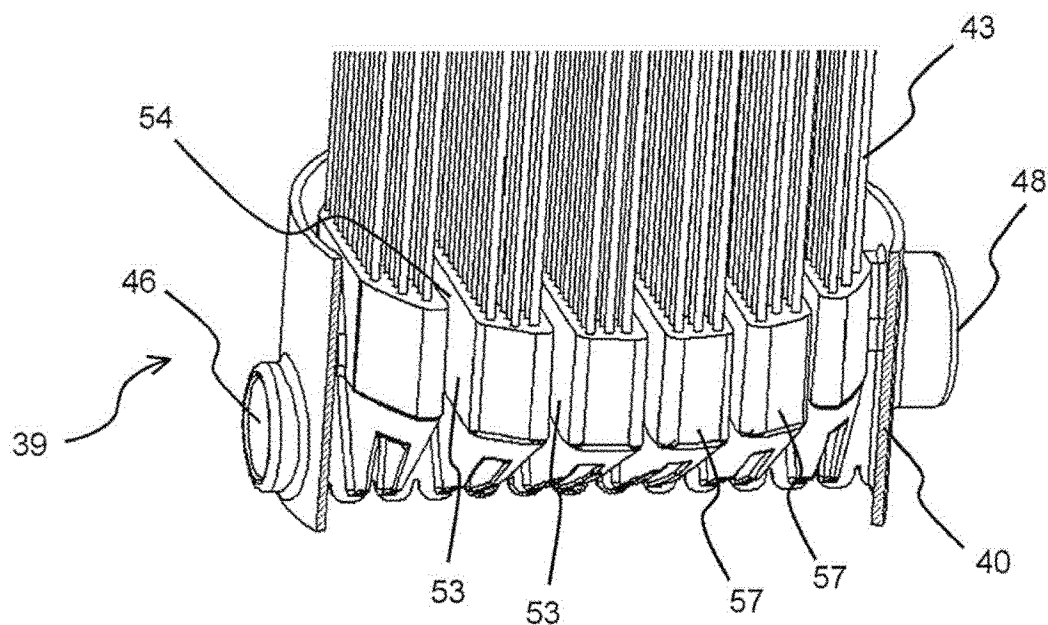
Figure 5D:
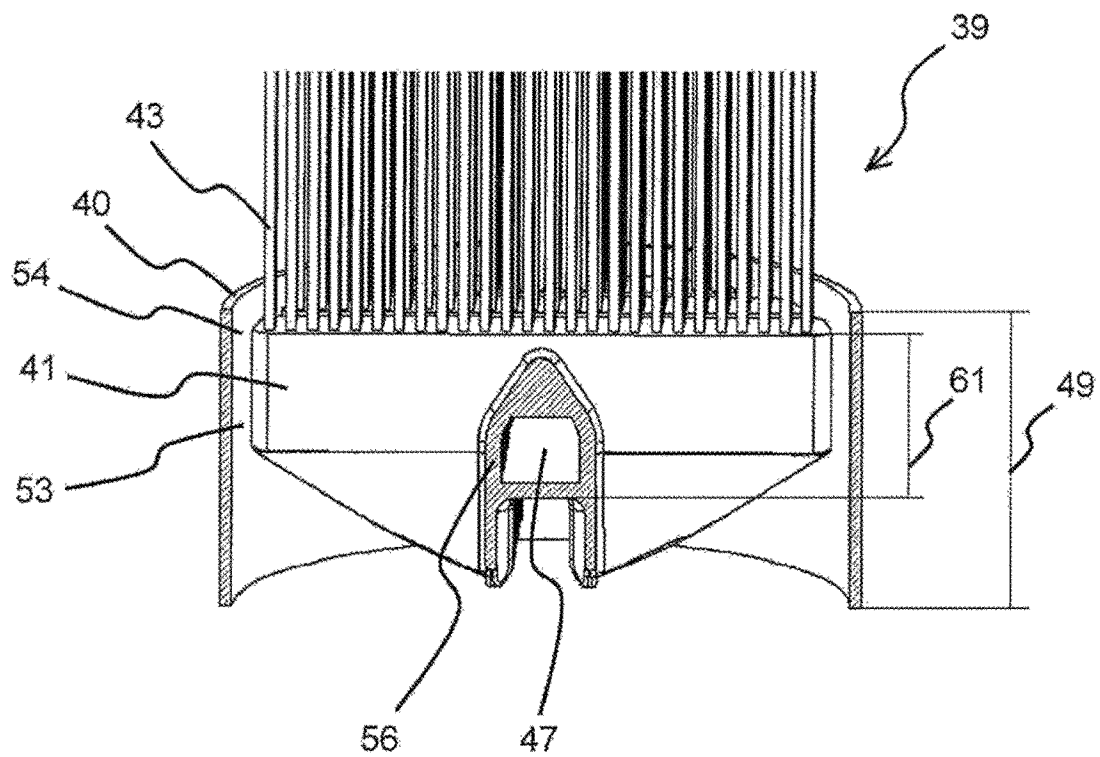
Figure 5E:
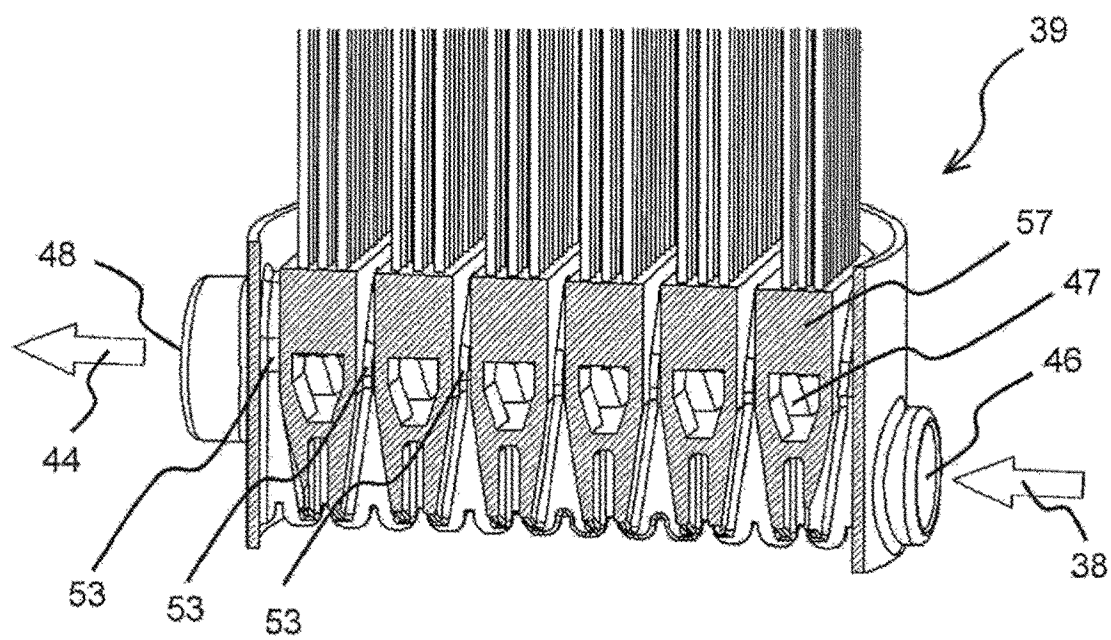
Figure 5F:
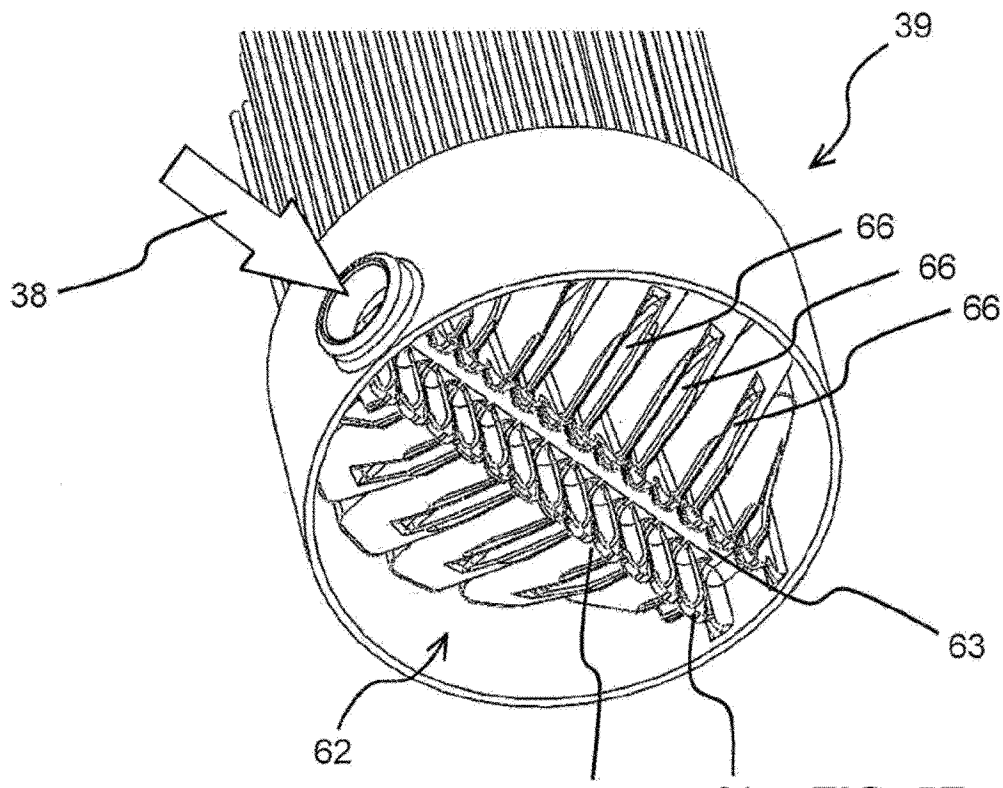
Figure 5G:
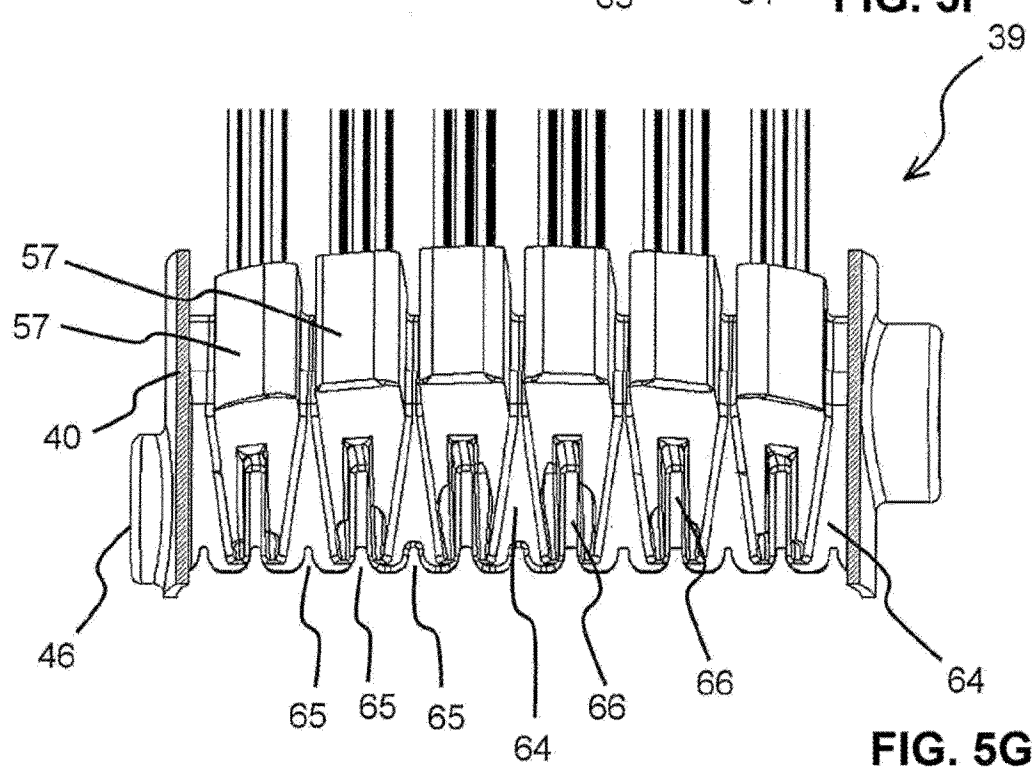
Figure 5H:
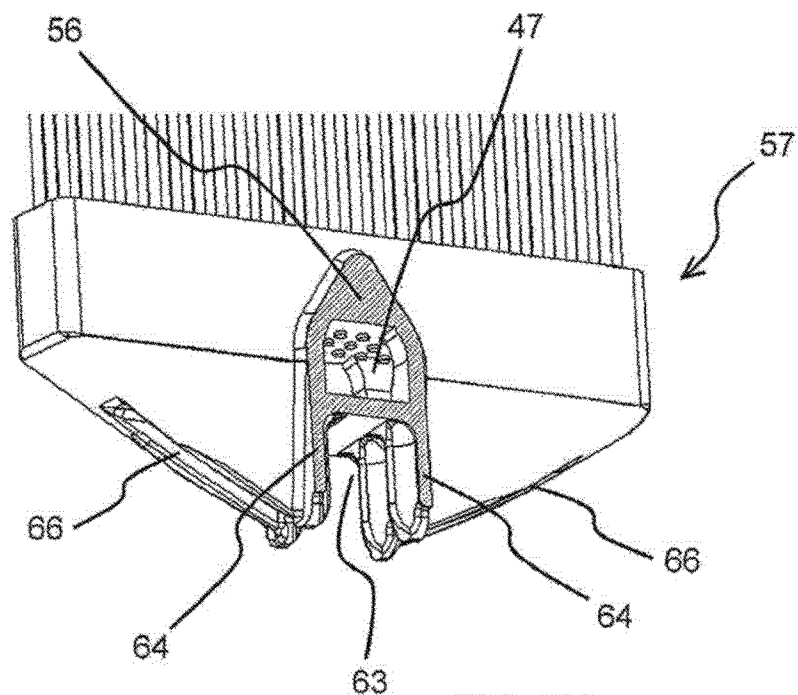
Figure 5I:
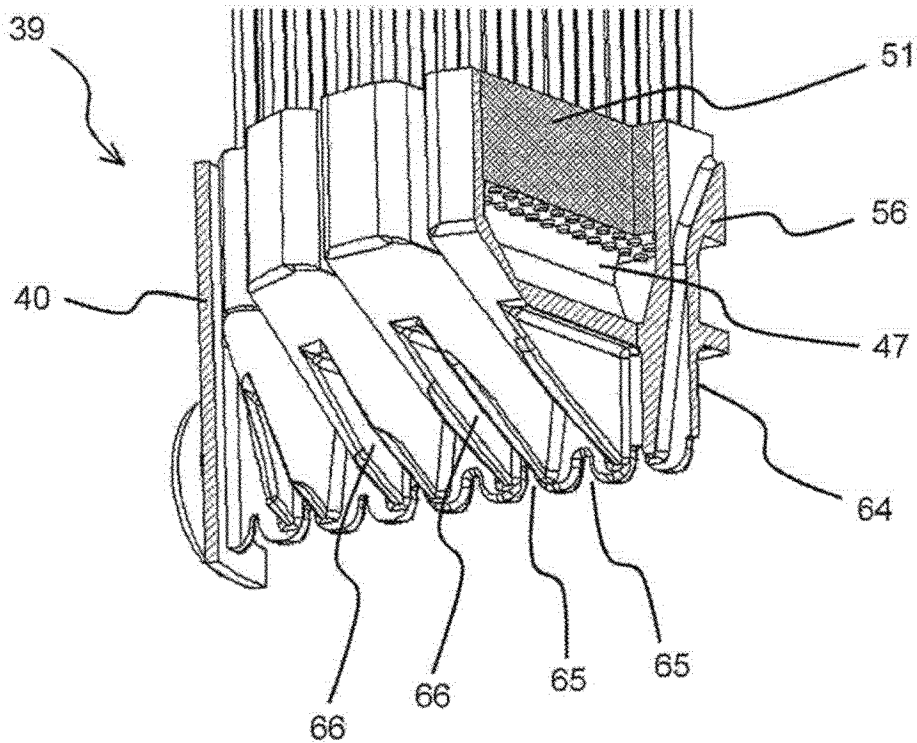
Figure 6A:
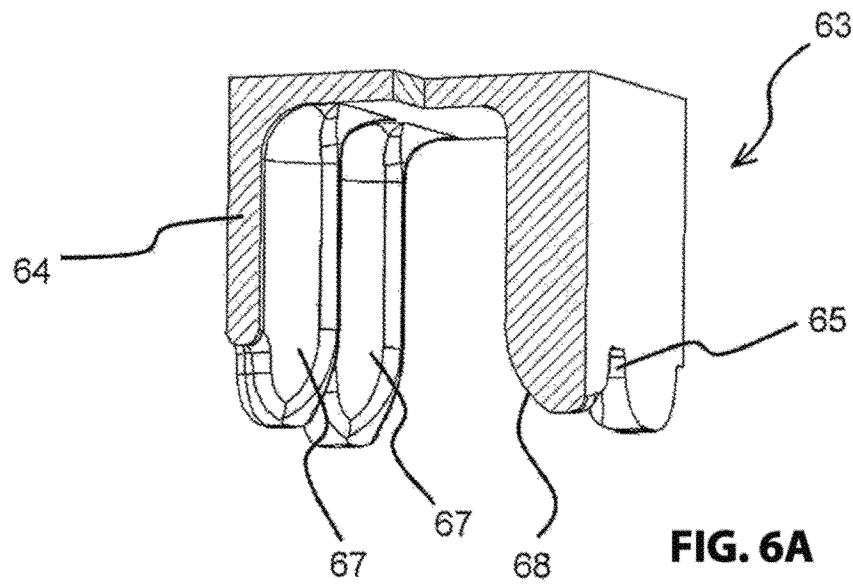
Figure 6B:
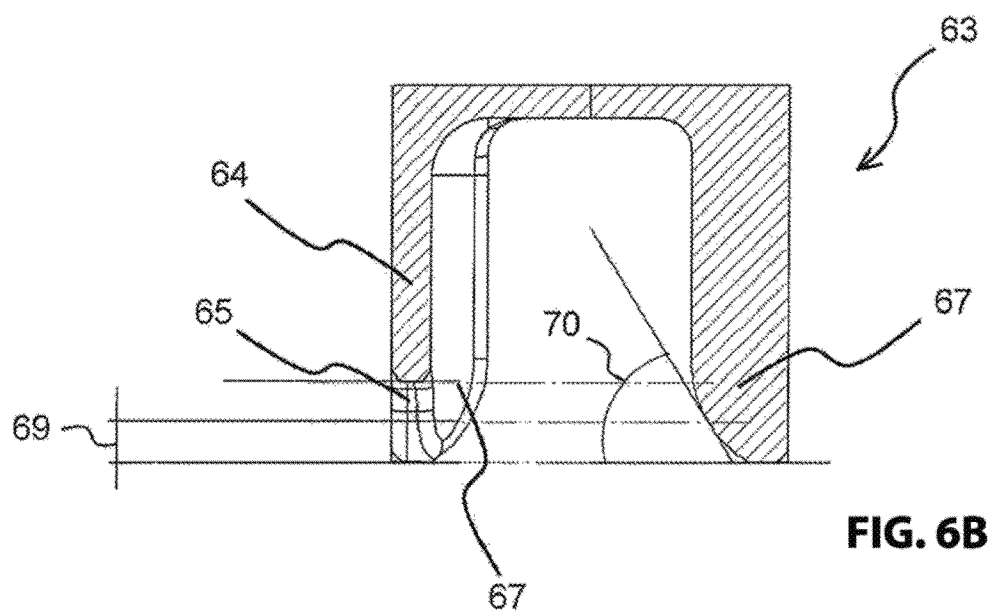
Figure 6C:
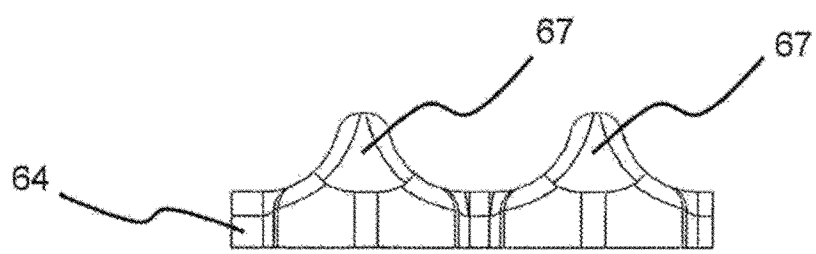

FIG. 5F illustrates a perspective view of the base element 39 of the second membrane filter 38 at a slant angle from below and FIG. 5G illustrates a half of the base element 39 with a cut up shell 40.

In the second membrane filter 36 the base element 39 includes the gas inlet 46. The gas inlet 48 is connected with a gas distribution system 62 formed at a bottom side of the membrane carrier 41 wherein the gas distribution system 62 includes a downward open and upward closed tube 63 which includes a wall 64 with downward open vertical slots 65 for distributing the gas 38 into the liquid 37 to be filtered. The width of the tub 63 corresponds to the width of the anchor 56 and is formed at its lower side. The gas inlet 46 adjoins laterally directly at the tub 63.

At each second slot 65 a gas conducting channel 66 is externally connected to the tub 63 wherein the gas conducting channel is configured at a bottom side of the finger 57 for conducting the gas 38 away from the tub in a direction towards the shell 40. The other slot 65 at which no gas conducting channel 66 are connected respectively open between two fingers 57 or for the outer fingers 57 between the fingers 57 and the shell 40 on an outside of the anchor 56. Thus the tub 63 has a wall 64 on each of its 2 longitudinal sides wherein the wall 64 respectively includes 13 slots 65. The slot 65 become wider in downward direction in order to also be able to compensate larger variations in the amount of gas that is being supplied.

The width of the slots 65 and thus also their cross sectional surface have different sizes. Thus the volume of the gas 38 is adapted to the surface of the hollow fiber membranes 43 flowing through the slots 65. Accordingly the slots 65 include wider slots 65 below the longer fingers 67 in a center of the base element 39 then the outer slots 65 below the shorter fingers 57. The narrowest slots 65 are the slots that open between the fingers 57. Through the configuration of the gas distribution system 62 with slot 65 and gas conduction channels 66 the gas 38 flows around the membrane carrier 41 after flowing in the liquid 37 to be filtered.

The base element 39 is flowable from the gas inlet 46 through the wall 63 through the slots 85 and through the flow cavity 53 to the outlet 54. The membrane carrier 41 closes the base element 39 besides the flow cavity 53 not only for the flow through of the liquid 37 to be filtered but also for the flow through of the gas 38.

FIG. 5H illustrates only one of the fingers 57 of the second membrane filter 38. Thus the anchor 58 is visible in a sectional view as well as the tub 83 formed on its bottom side. Furthermore gas conducting channels 66 are visible on a bottom side of the finger 57, wherein the gas conducting channels 86 extend on both sides of the tub 63.

FIG. 5I shows a sectional view of the gas conducting channel 66 in the base element 39 of the second membrane filter 36. Thus it is evident that the gas conducting channel 66 adjoin the slots 85 vertically offset in upward direction.

Figure 6A:
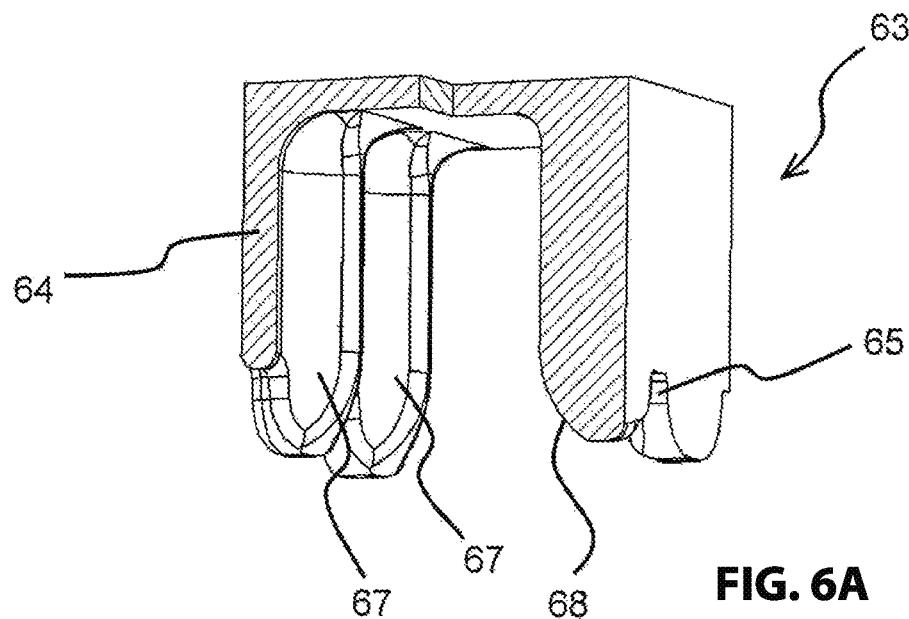
FIGS. 6A-6C illustrate partial views and sectional views of the gas distribution system of the second membrane filter.
Figure 6B:
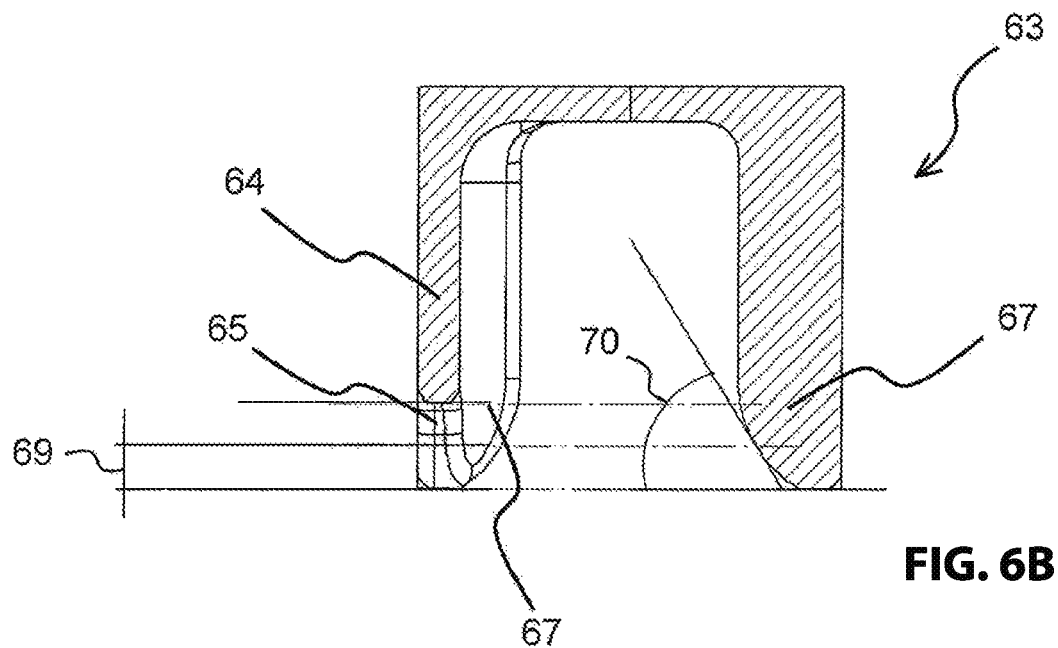
Figure 6C:
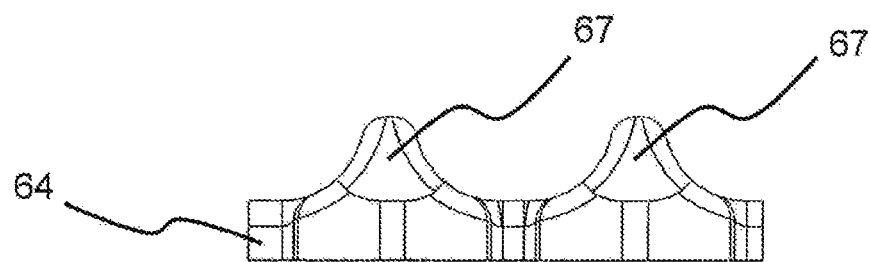

FIGS. 6A-6C illustrate views and sectional views of elements of the tub 63 of the second membrane filter 36.

The tub 63 includes vertical ribs 67 respectively extending in a center between adjacent slots 65 orthogonal to the wall 64. Each rib 67 includes a taper at a bottom which runs towards the wall 64 and thus forms a slanted or rounded inner edge 68 of the tub 63.

Geometrically speaking the tub 83 includes an inner edge 68 respectively extending between adjacent slots 65 in a vertical sectional view wherein the vertical sectional view in this case extends orthogonal to the wall 64 through the rib 67 wherein the inner edge at least in a portion of a lower half 69 of the slot 65 includes in every point an angle 70 relative to horizontal of less than 60° at a level of the half 69 of the slots 65 of 58°. The non illustrated filtration operations of the second membrane filter 56 differs from titrations operations of the first membrane filter 1 as follows.

The gas 38 flows through the gas inlet 46 into the tub 63 and fills the tub 63 and the slots 65 up to a portion of the height of the slot 65 with a gas cushion. From the gas cushion the gas 38 flows through the slot 65 in laterally outward direction from the tub 63 and thus at plural locations below the membrane carrier 41 into the liquid 37 to be filtered. Thus the gas 38 flows out of the slot 65 into bulges 55 of the flow cavity 53 respectively between two fingers 57 and on the other hand side out of the slot 65 below the finger 57 into the gas conduction channel 66. Through the gas conduction channel 86 the gas 38 flows in outward direction further away from the tub 83 into the outer portion of the membrane filter 36.

During lateral flow through the slots 65 a liquid flow that is oriented parallel to the lateral gas flow is generated at the face boundary below the gas cushion wherein the liquid flow flows against the inner edge 68 of the rib 67. Based on the angle 70 of the inner edge 68 of the tub 63 which is arranged between two slots 65 hair and fibrous compounds can be stripped off when the inner edge 68 is exposed to a flow which significantly reduces a clogging propensity of the membrane filter 36.

After the gas enters the liquid 37 to be filtered the membrane carrier 41 is flowed by the gas 38 and the liquid 37 before the mix from gas 38 and liquid 37 flows around the hollow fibers membranes 43 attached at a top in the membrane carrier 41. Due to the high shear force of the two phase flow the hollow fiber membranes and the membrane carrier 41 are flushed on an outside.

The base element 39 is flowed by the gas 38 starting from the gas inlet 48 through the tub 63 through the slot 65 and through the flow cavity 53 to the outlet 54. Since the flow cavity 53 is always arranged between the shell 40 and the membrane carrier 41 and furthermore protrudes through the bulges 55 also into the inner portion of the membrane filter 36 this generates even gassing of the membrane filter 36 over the entire cross section while avoiding a flow through of small parallel connected flow cavities. Thus over all the blocking propensity of the membrane filter 36 is reduced compared to what is known in the art.

Also the second membrane filter 36 can be set up for submerged operations or dry operations.

FIG. 7A-D illustrate additional variants of membrane filters according to the invention with a base element and a head element.

FIG. 7A illustrates a third membrane filter 71 according to the invention. This membrane filter differs from a first membrane filter 1 in that a base element 72. is adjoined on top by a closed tube 73 which envelops the hollow fiber membrane 74 and which adjoins at a head element (75) on top. The head element 75 includes a shell 78 and a membrane carrier 77, included therein wherein the membrane carrier 77 is connected with the shell 76 only through an anchor location 78. In the head element 75 the hollow fiber membrane 74 are encased and attached on top by a resin layer 79 in a sealing manner relative to the liquid to be filtered with their lumens in an open manner.

The head element 75 includes a permeate collecting cavity 80 which is flow connected with the lumens of the hollow fiber membranes 74 for collecting the permeate and a permeate outlet 81 for draining the permeate. Furthermore the head element 75 includes a second flow cavity 82 for flowing the gas and the liquid to be filtered and flowing out of the head element 75. The third membrane filter 71 can be used in submerged operations and in dry set up operations.

FIG. 7B illustrates a fourth membrane filter 83 according to the invention. The fourth membrane filter differs from the third membrane filter 71 in that a tube 84 which adjoins at a base element 85 on top is adjoined on top initially by a tube insert 88 with openings 87 for lateral outflowing of a portion of the gas and of the liquid to be filtered from the tube 84. The tube insert 88 and the tube 84 are made for the fourth membrane filter 83 form one piece. A head element 88 adjoins on top to the tube insert 86 wherein the head element 88 has the same details as the head element 75 of the third membrane filter 71. The base element 85 forms another difference to the third membrane filter 71 wherein the base element 85 does not have any permeate collecting cavity, this means the hollow fiber membranes 39 are closed at a bottom and encased with resin in the base element 85 and fixated. The permeate generated in the hollow fiber membranes 39 only flows into the permeate collecting cavity 90 of the head element 88, is collected therein and flows through a permeate outlet 91 from the fourth membrane filter 83. This fourth membrane filter 83 can only be used in submerged operations due to the openings 87 in the tubular insert 86.

Figure 7C:
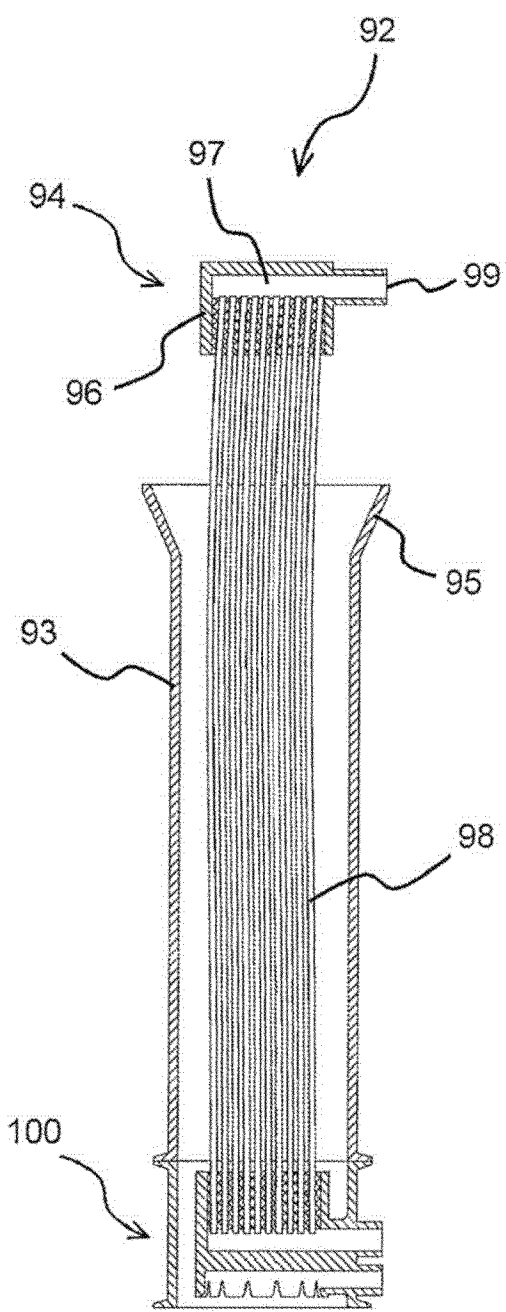

FIG. 7C illustrates a fifth membrane filter 92 according to the invention. The fifth membrane filter differs from the third membrane filter 71 in that the tube 93 is not run to the head element 94 but terminates even earlier with a tubular expansion 95 on top. Thus the head element 93 is not connected with the tube 93 and is accordingly not configured flowable for the liquid to be filtered and the gas. Therefore it only includes one membrane carrier 96 with hollow fiber membranes 98 that are resin connected and open towards a permeate collecting cavity 97 and a permeate outlet 99 adjoining the permeate collecting cavity 97 for collecting and draining a portion of the permeate generated from the hollow fiber membranes 98. The other portion of the permeate is drained from a base element 100 that is identical to the base element of the third membrane filter 71. Also the fifth membrane filter 92 can only be used m submerged operation due to the open configuration between the tube 93 and the head element 94.

Figure 7D:
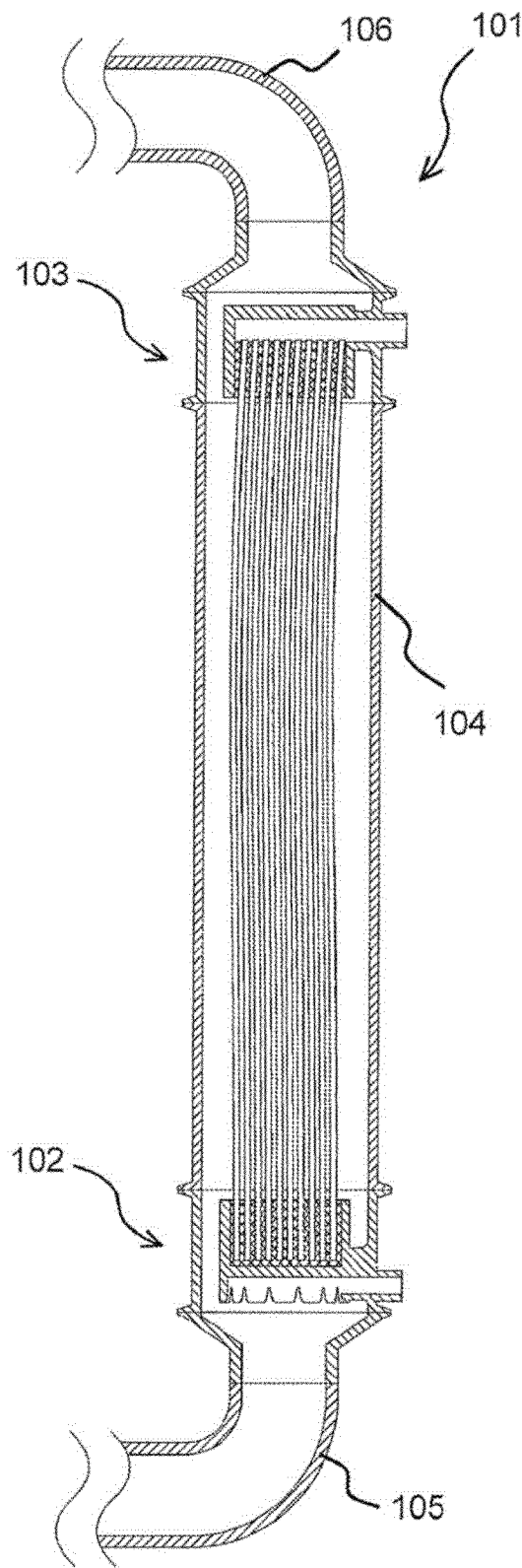
Figure 8A:
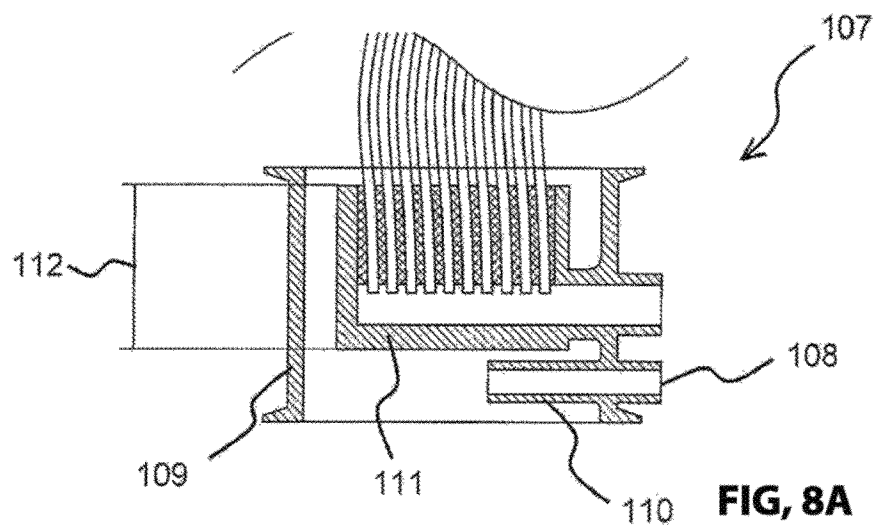
Figure 8B:
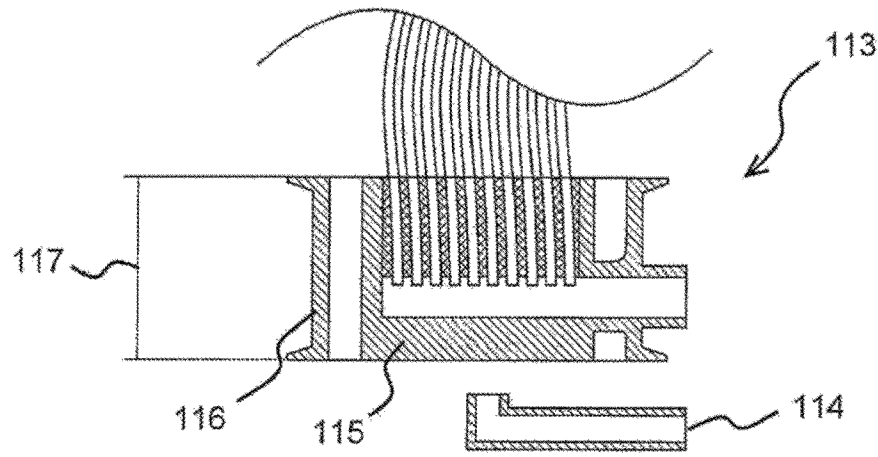
Figure 8C:
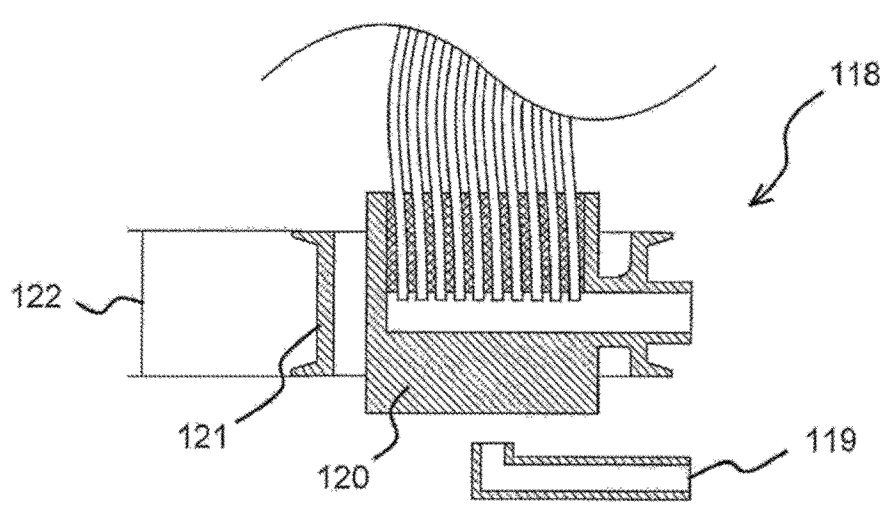
Figure 9A:
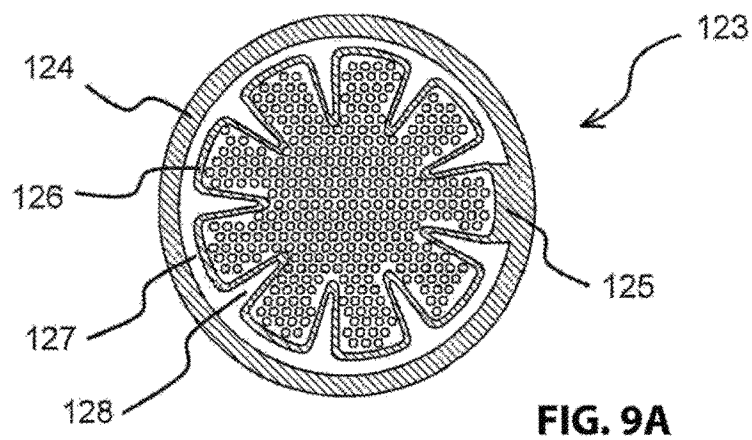
Figure 9B:
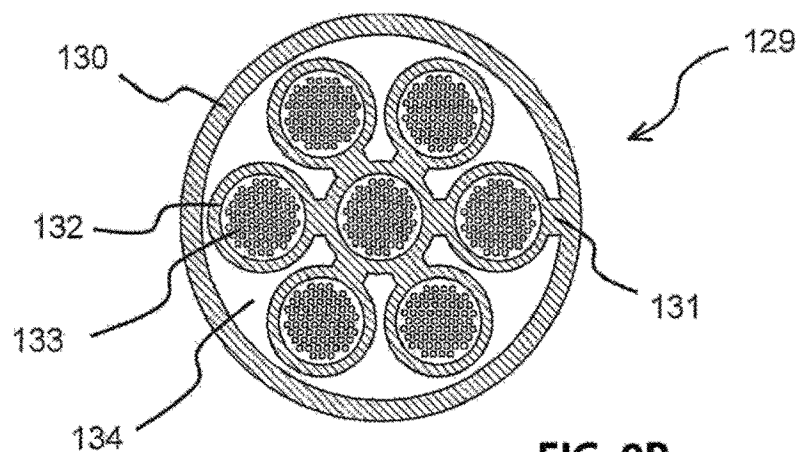
Figure 9C:
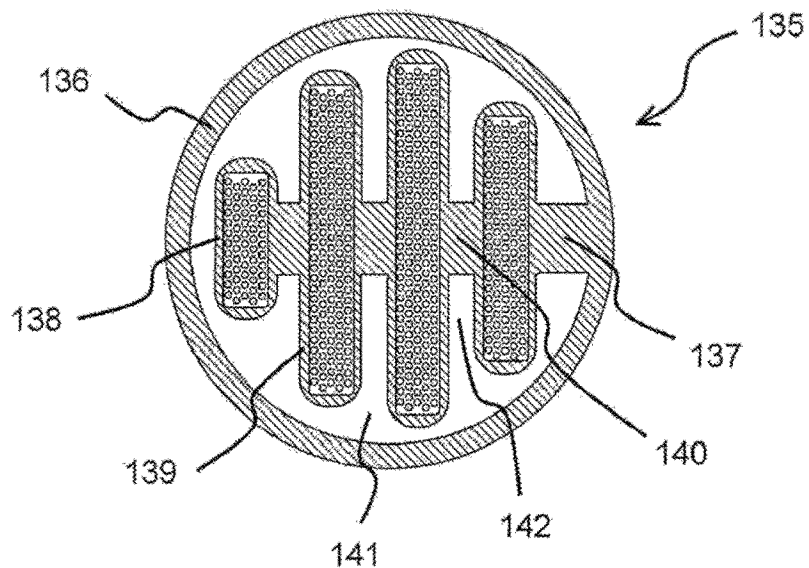

FIG. 7D illustrates a sixth membrane filter 101 according to the invention. The sixth membrane filter 101 respectively includes a base element 102 and a head element 103 which are identical to the respective elements of the fourth membrane filter 83 and which are connected through a continuously closed tube 104. The sixth membrane filter 101 according to the invention is configured for dry operations. Thus a first liquid conduit 105 is connected to the base element 102 for letting the liquid to be filtered flow from below into the base element 102. Furthermore a second liquid conduit 108 adjoins the head element 103 for letting out the liquid and the gas from the sixth membrane filter 101.

Figure 8A:
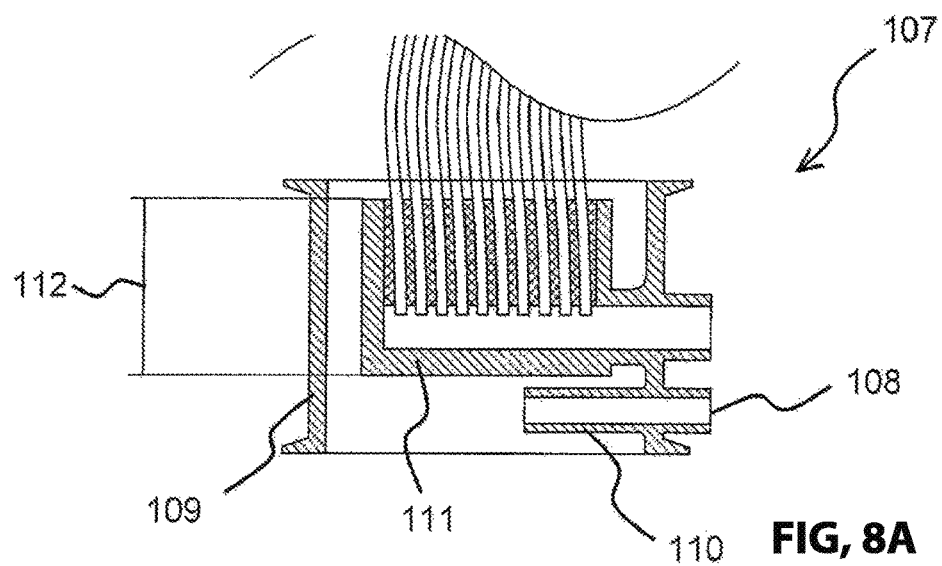
FIGS. 8A-8C illustrate details of additional membrane filters according to the invention.
Figure 8B:
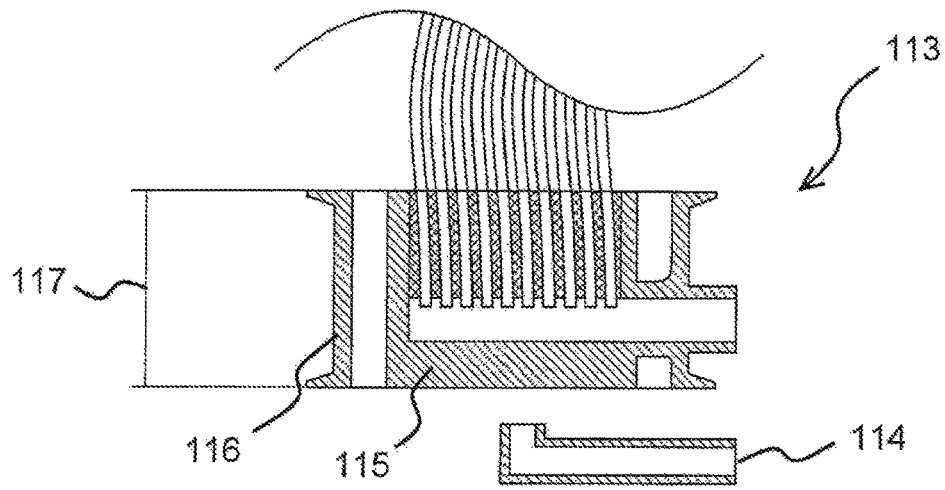
Figure 8C:
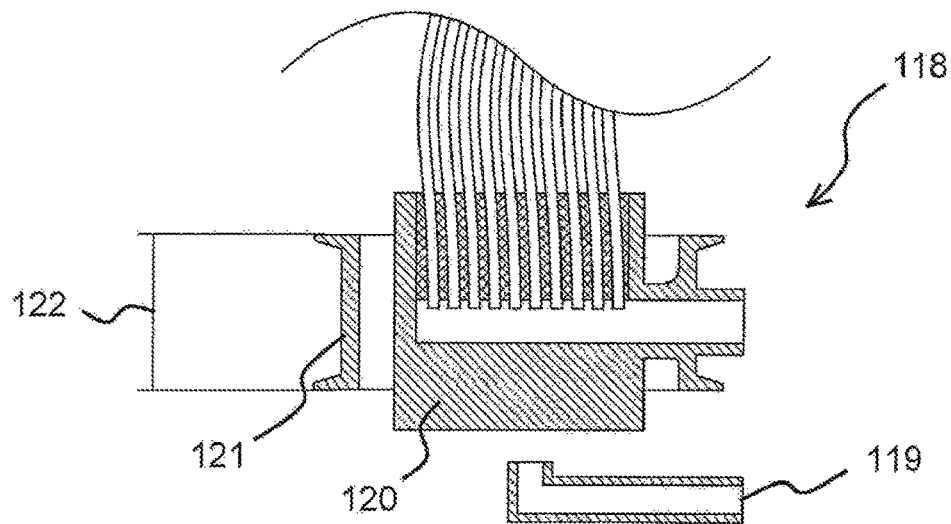

FIGS. 8A-8C illustrate sectional views through base elements of three additional membrane filters according to the invention with variants of the gas inlet and the height of the flow cavity which is formed from the overlap portion of the heights of the shell and membrane carrier.

FIG. 8A illustrates a sectional view through a base element 107 of a seventh membrane filter according to the invention in which the base element 107 includes a gas inlet 108 which is continued on an inside of the shell 109 as a tubular spout 110 towards the center of the base element 107 where the gas flows out centrally below a membrane carrier 111 and subsequently flows around the membrane carrier. The shell 109 of the base element 107 protrudes beyond the membrane carrier 117 on top and at a bottom so that the height 112 of the flow cavity defined by the intersecting portion of the heights of shell 109 and membrane carrier 111 is identical in this case with the height of the membrane carrier 111.

FIG. 8B illustrates a sectional view of the base element 113 of an eighth membrane filter according to the invention in which the base element 113 does not include a gas inlet 114. The gas is fed herein separately from the base element 113 from below centrally below the membrane carrier 115 through the gas inlet 114 and subsequently flows around the membrane carrier 115. The dimensions of the shell 116 of the base element 113 are flush on top and on the bottom with the dimensions of the membrane carrier 115 so that the height 117 of the flow cavity coincides in this case with the height of the membrane carrier 115 and the height of the shell 116. FIG. 8C illustrates a sectional view of a base element 118 of a ninth membrane filter according to the invention in which the gas inlet 119 is identical with the gas inlet of the eighth membrane filter according to the invention, the membrane carrier 120 of the base element 118 protrudes at a top and at a bottom beyond the shell 121 so that the height 122 of the flow cavity that is defined in this case by the overlapping portion of the heights of the membrane carrier 120 and the shell 121 is identical in this case with the height of the shell 121.

Figure 9A:
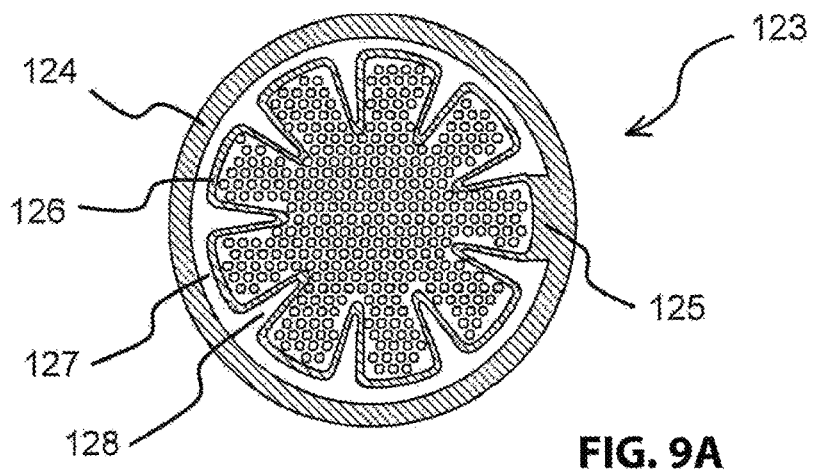
FIGS. 9A-9C illustrate membrane carriers of additional membrane filters according to the invention.
Figure 9B:
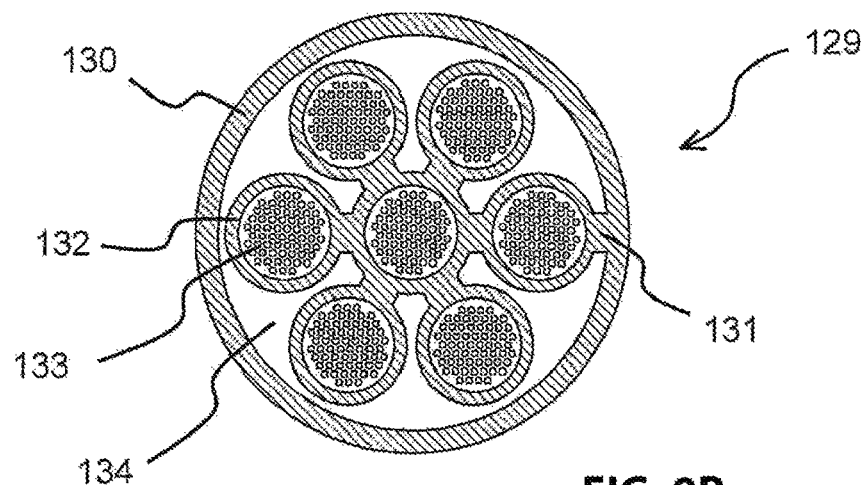
Figure 9C:
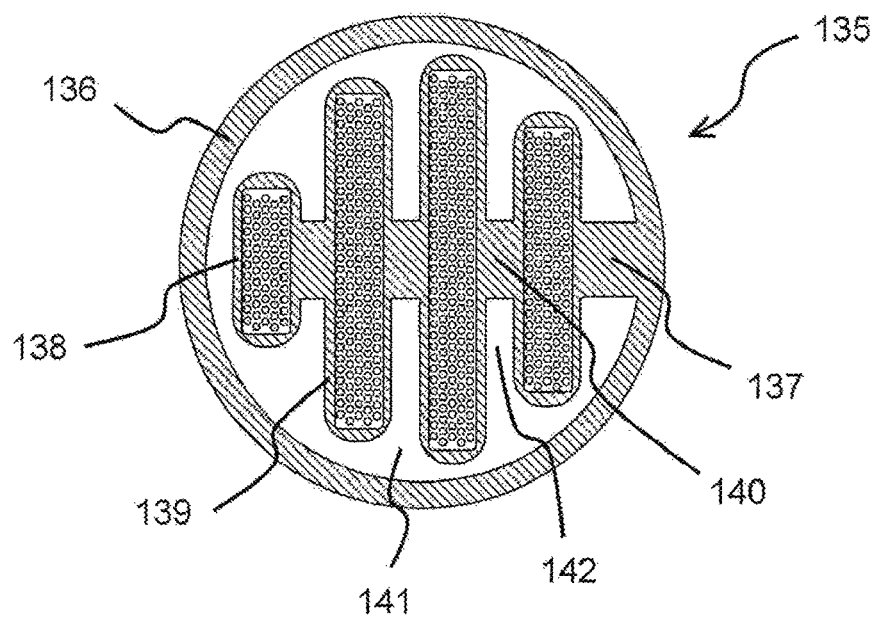
Figure 1A:
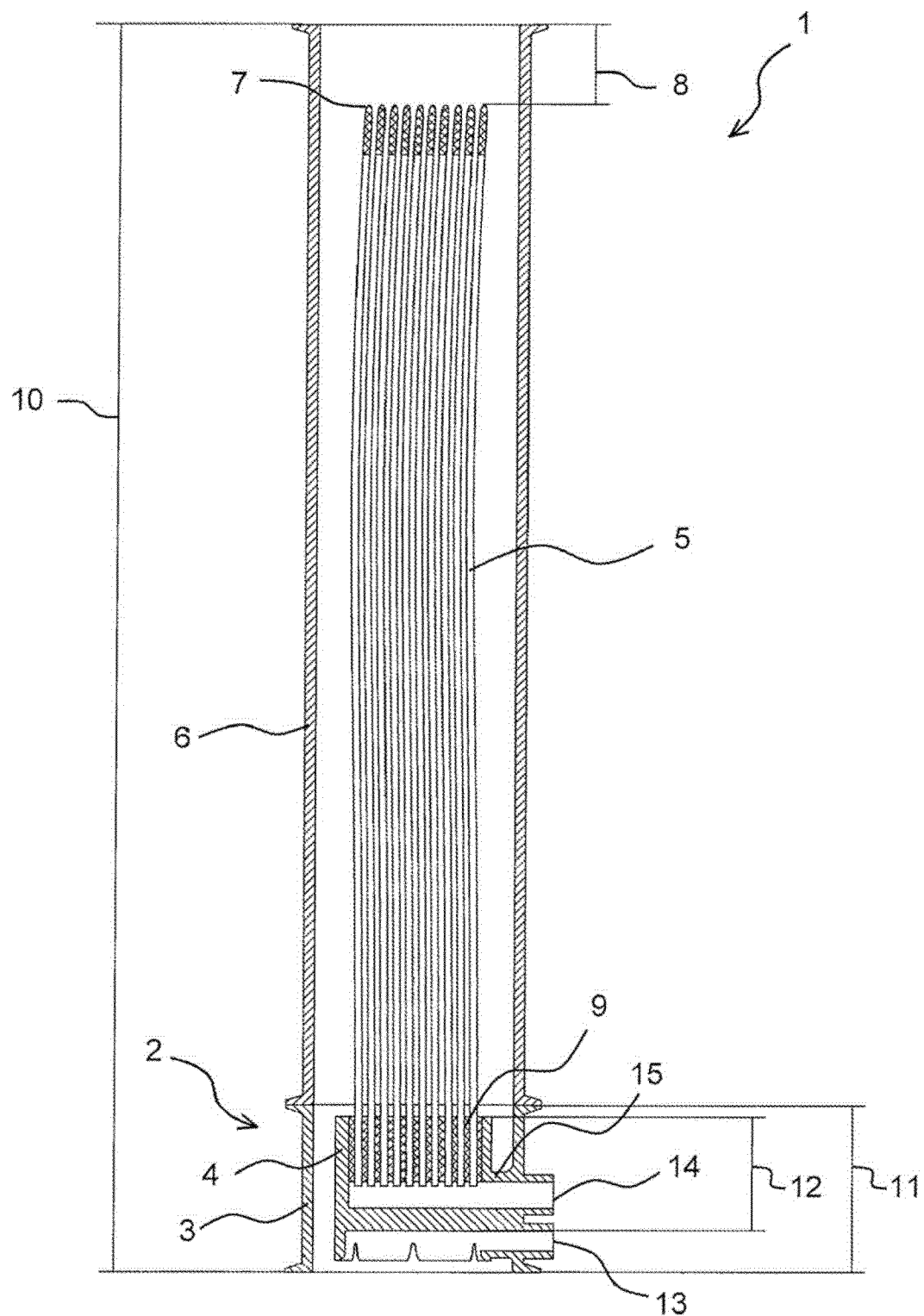
Figure 1B:
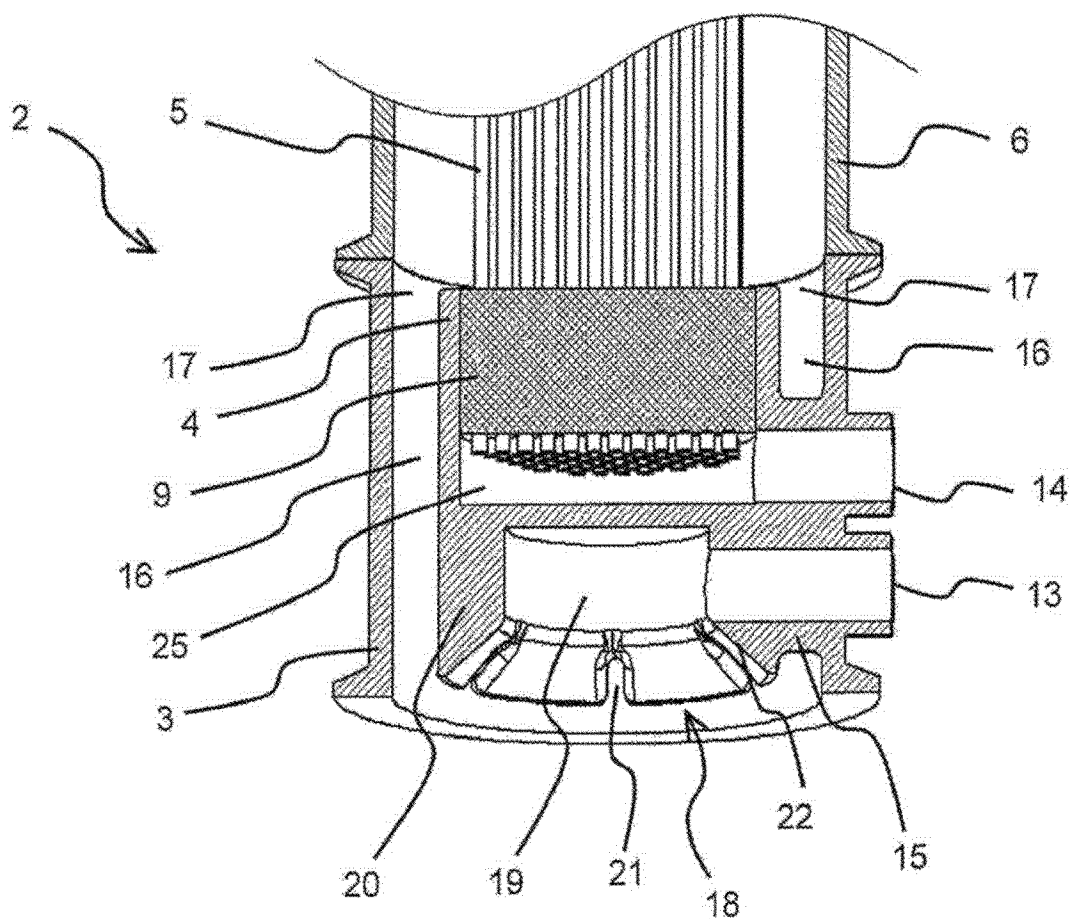
Figure 1C:
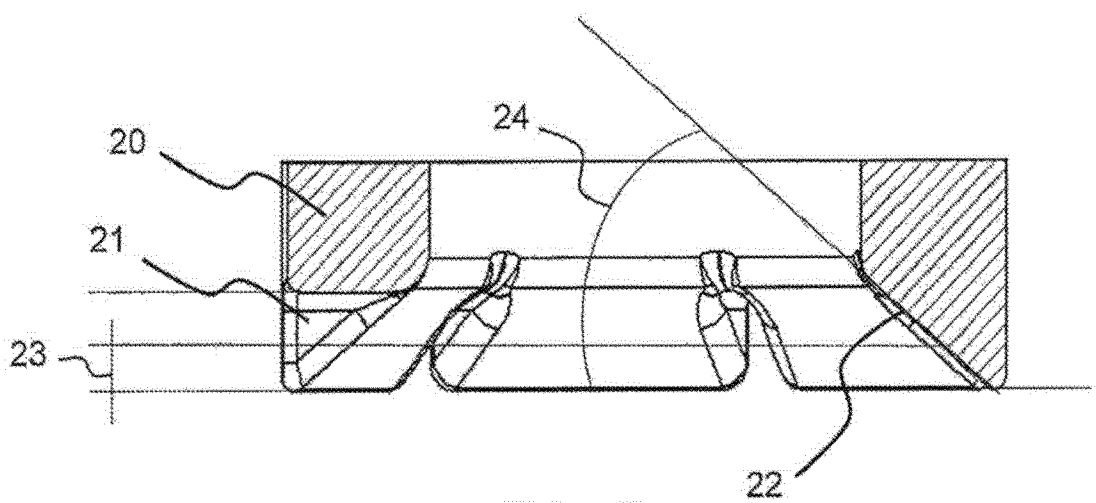
Figure 1D:
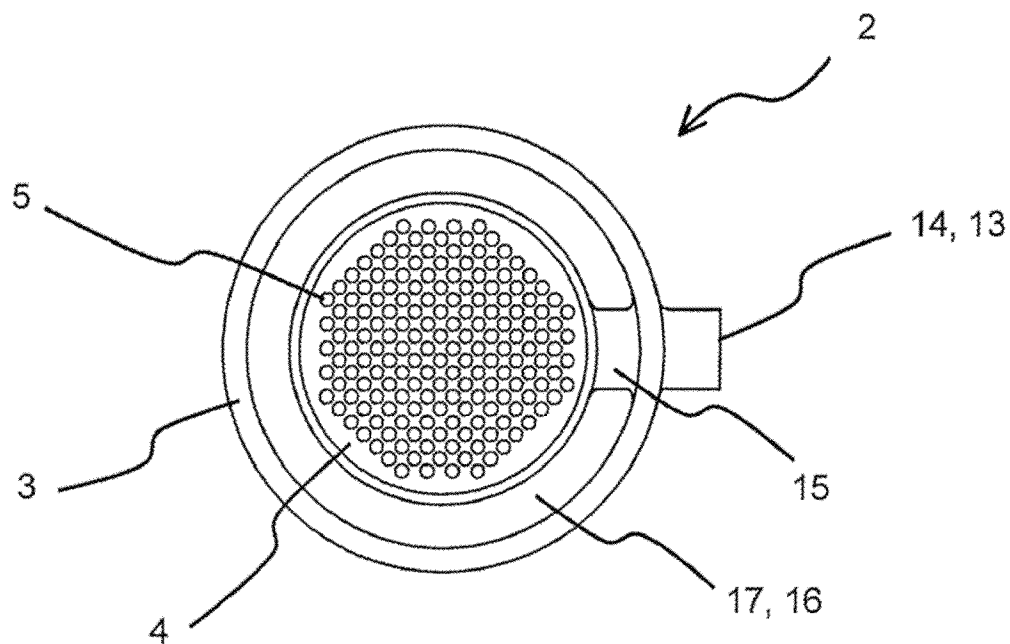
Figure 1E:
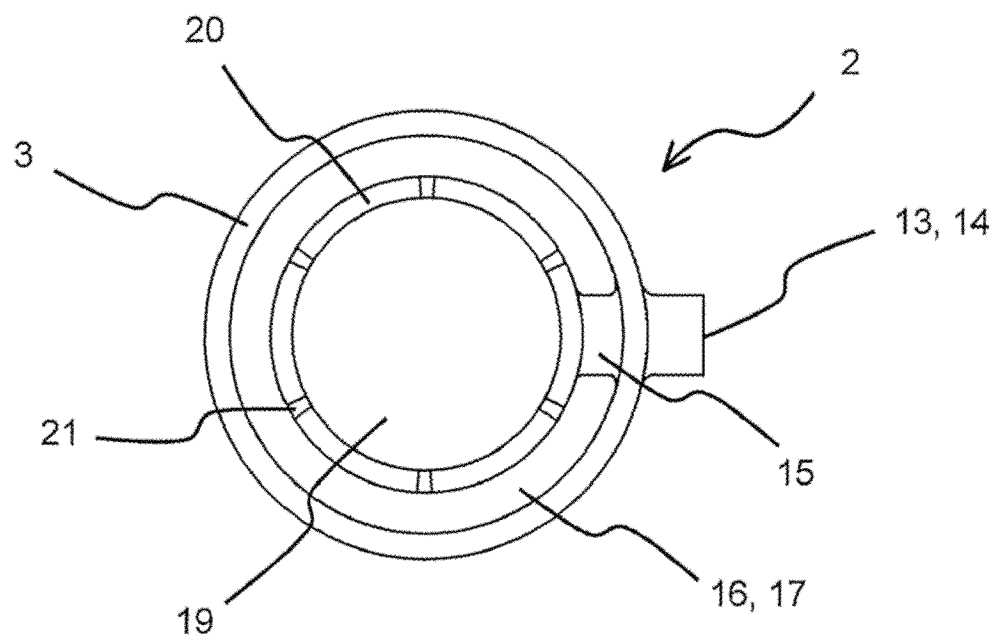
Figure 3:
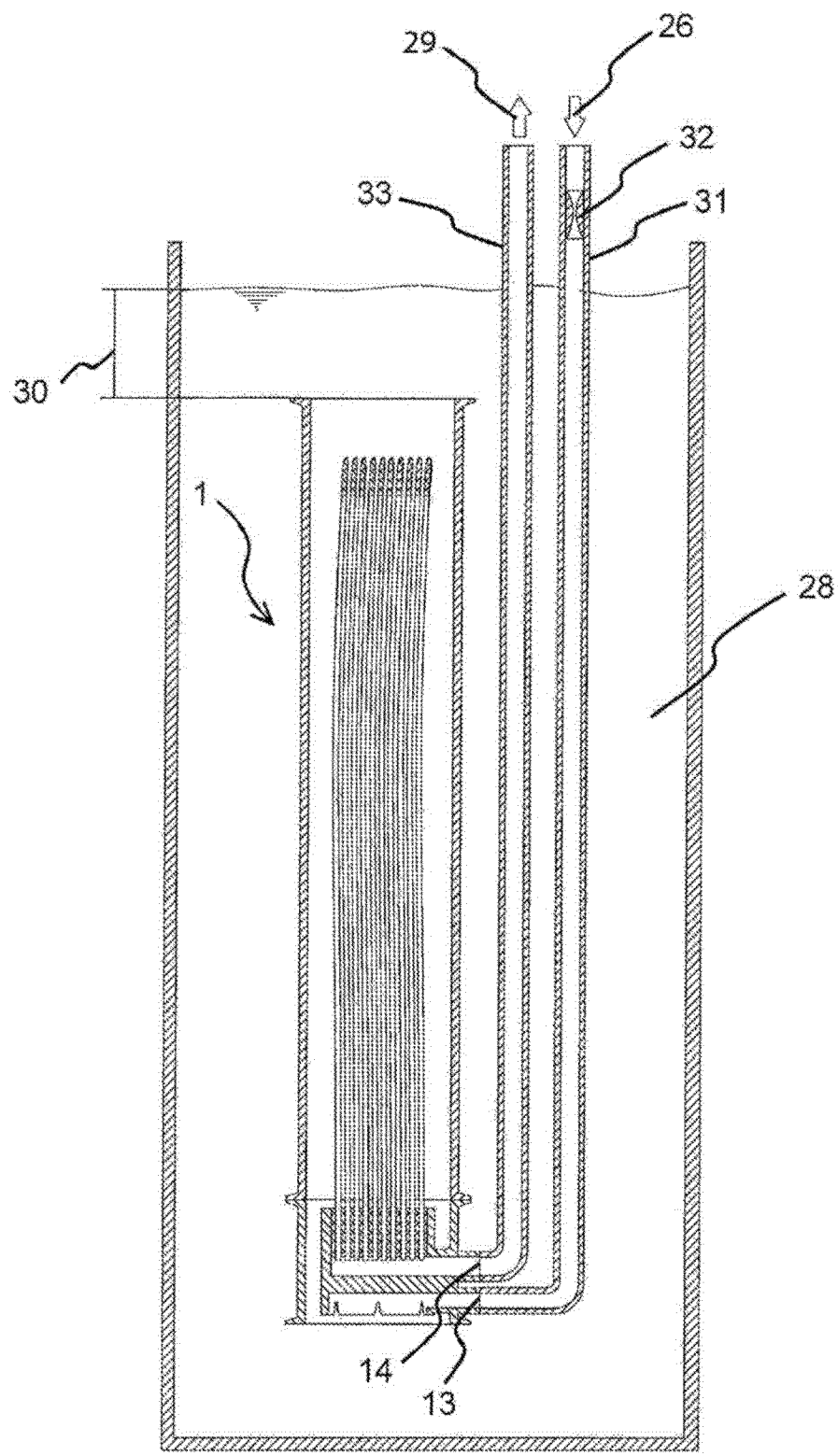
Figure 4:
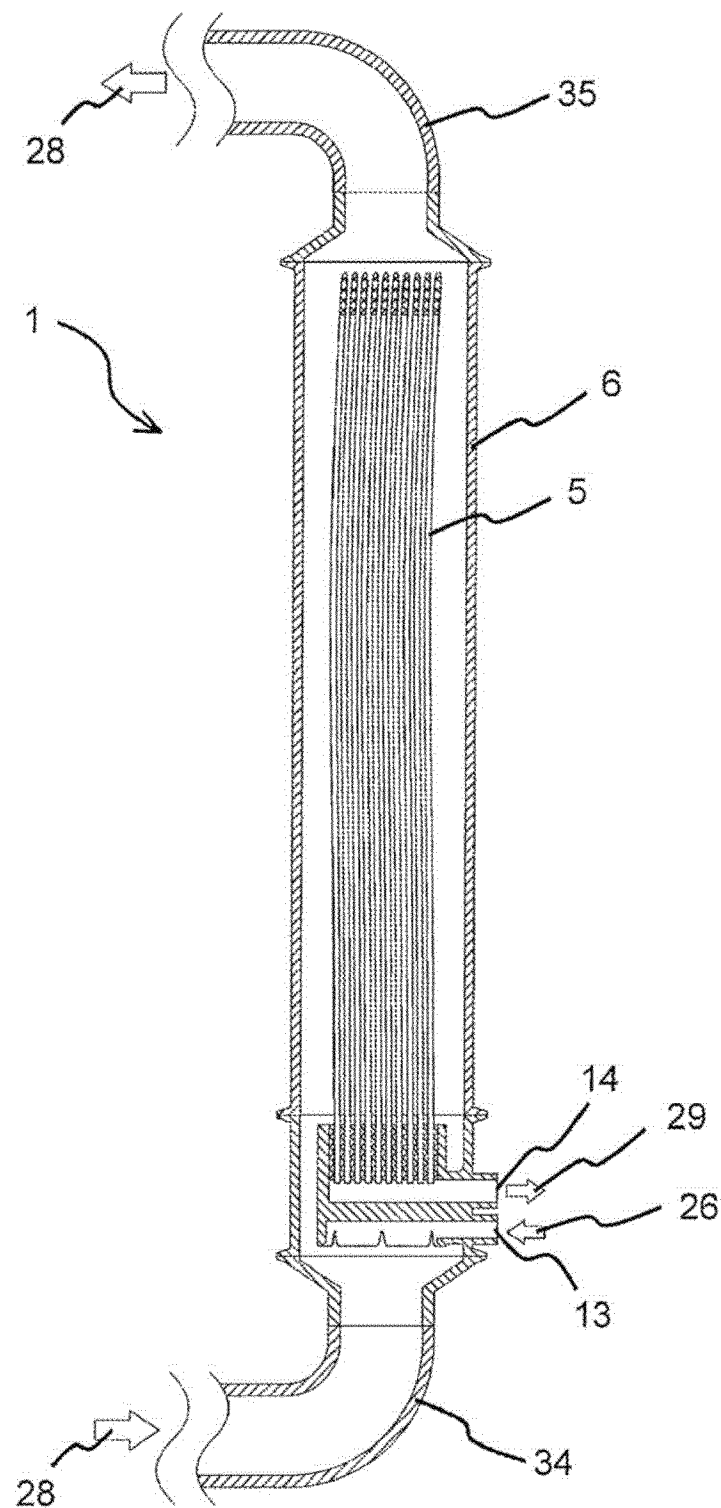

FIGS. 9A-9C illustrates variants of the shape of the membrane carrier in additional membrane filters according to the invention. These variants can be implemented in particular in all previously described membrane filters.

FIG. 9A illustrates a base element 123 of a tenth membrane filter according to the invention which includes a shell 124 with a membrane carrier 128 arranged therein that is connected with the shell 124 only through an anchor location 125. Between the shell 124 and the membrane carrier 126 there is a flow cavity 127 with bulges 128 into the membrane carrier 126. The membrane carrier 126 closes the base element 123 besides the flow cavity 127 entirely for the flow through of the gas and the liquid to be filtered.

FIG. 9B illustrates a base element 129 of an eleventh membrane filter according to the invention which includes a shell 130 with a membrane carrier 132 arranged therein and connected to the shell 130 only through an anchoring location 131. The membrane carrier 132 includes 7 membrane bundles 133 wherein 6 membrane bundles are arranged similar to a blossom structure about a central membrane bundle 133. Between the shell 130 and the membrane carrier 132 there is a flow cavity 134. The membrane carrier 132 closes the base element 129 completely for the flow through of the gas and the liquid to be filtered besides the flow cavity 134.

FIG. 9C illustrates a base element 135 of a twelfth membrane filter according to the invention which includes a shell 136 with a membrane carrier 138 arranged therein and connected with the shell 135 only through an anchoring location 137 wherein the membrane carrier includes 4 fingers 139 that are connected with one another through an anchor 140 and which are attached at the anchor location 137. Between the shell 136 and the membrane carrier 138 there is a flow cavity 141 with bulges 142 and to the membrane carrier 138 which reach to the anchor 140. The membrane carrier 138 closes the base element 135 besides the one flow cavity 141 completely for a flow through of the gas and or the liquid to be filtered.

REFERENCE NUMERALS AND DESIGNATIONS 1 membrane filter
2 base element
3 shell
4 membrane carrier
5 hollow fiber membrane
6 tube
7 upper end
8 length
9 resin layer
10 height membrane filter
11 height base element
12 height membrane carrier
13 gas inlet
14 permeate outlet
15 anchor location
16 flow cavity
17 outlet
18 gas distribution system
19 tub
20 wall
21 vertical slot
22 inner edge
23 lower half
24 angle
25 permeate collecting cavity
26 gas
27 gas cushion 28 liquid to be filtered
29 permeate
30 liquid overhang
31 gas feed conduit
32 throttle
33 permeate conduit
34 first liquid conductor
35 second liquid conductor
36 membrane filter
37 liquid to be filtered
38 gas
39 base element
40 shell
41 membrane carrier
42 anchor location
43 hollow fiber membrane
44 permeate
45 tube
46 gas inlet
47 permeate collecting cavity
48 permeate outlet
49 height
50 height
51 resin layer
52 upper end
53 flow cavity
54 outlet
55 bulge
56 anchor
57 finger
58 flow channel
59 width
60 diameter
61 height
62 gas distribution system
63 tub
64 wall
65 slot
66 gas conducting channel
67 rib
68 inner edge
69 half
70 angle
71 membrane filler
72 base element
73 tube
74 hollow fiber membrane
75 head element
76 shell
77 membrane carrier
78 anchor location
79 resin layer
80 permeate collecting cavity
81 permeate outlet
82 flow cavity
83 membrane filter
84 tube
85 base element
86 tube insert
87 opening
88 head element
89 hollow fiber membrane
90 permeate collecting cavity
91 permeate outlet
92 membrane filter
93 tube
94 head element
95 tube expansion
96 membrane carrier
97 permeate collecting cavity
98 hollow fiber membrane
99 permeate outlet
100 base element
101 membrane filter
102 base element
103 head element
104 tube
105 first liquid conductor
106 second liquid conductor
107 base element
108 gas inlet
109 shell
110 tubular spout
111 membrane carrier
112 height
113 base element
114 gas inlet
115 membrane carrier
116 shell
117 height of the flow cavity
118 base element
119 gas inlet
120 membrane carrier
121 shell
122 height of flow cavity
123 base element
124 shell
125 anchor location
126 membrane carrier
127 flow cavity
128 bulge
129 base element
130 shell
131 anchor location
132 membrane carrier
133 membrane bundle
134 flow cavity
135 base element
136 shell
137 anchor location
138 membrane carrier
139 finger
140 anchor
141 flow cavity
142 bulge

The invention claimed is:

1. A membrane filter for filtering a liquid, the membrane filter comprising:
a base element that is open in a downward direction and capable of allowing a flow by a gas and by the liquid and that includes a tubular shell and one membrane carrier arranged in the tubular shell, which one membrane carrier is connected with the tubular shell by at least one anchor location;
hollow fiber membranes attached at a top of the one membrane carrier and respectively including lumens into which a liquid permeate is filterable from the liquid;
a circumferentially closed tube which adjoins the tubular shell at a top of the tubular shell and which envelops the hollow fiber membranes, such that the circumferentially closed tube extends beyond an upper end of the hollow fiber membranes;

a gas inlet for letting the gas into the base element by initially letting the gas into a tub which then flows out openings in the tub into the at least one downward open flow cavity;

at least one permeate collecting cavity which is connected with each lumen of the hollow fiber membranes and configured to collect the permeate from the hollow fiber membranes;

at least one permeate outlet configured to let the permeate out from the at least one permeate collecting cavity; and at least one downward open flow cavity that is arranged between the tubular shell and the one membrane carrier, wherein the at least one downward open flow cavity is configured to flow the liquid through, wherein the at least one downward open flow cavity includes an outlet at a top of the at least one downward open flow cavity for letting the liquid out into the circumferentially closed tube, wherein the at least one downward open flow cavity is in contact with and adjacent to the tubular shell and also in contact with and adjacent to the one membrane carrier in each horizontal section through the one membrane carrier, wherein the at least one downward open flow cavity envelops the one membrane carrier and forms an annular gap which is only interrupted by the at least one anchor location, wherein a height of the at least one downward open flow cavity equals an overlap portion of a height of the one membrane carrier with a height of the tubular shell, wherein the one membrane carrier closes the base element completely for a flow of the liquid from a bottom of the base element to a top of the base element with an exception of the at least one downward open flow cavity, wherein the base element is capable of allowing a flow sequentially from the gas inlet through the at least one flow cavity to the outlet, and wherein the at least one flow cavity includes bulges extending into the one membrane carrier.

2. The membrane filter according to claim 1, wherein the one membrane carrier includes fingers which are formed by the bulges and which are connected by an anchor of the one membrane carrier.

3. The membrane filter according to claim 1, wherein the one membrane carrier is connected with the tubular shell by a maximum of two anchor locations which are arranged in line with the anchor.

4. The membrane filter according to claim 1, wherein the one membrane carrier is completely separate from the tubular shell in each horizontal section through the one membrane carrier above the at least one anchor location.

5. The membrane filter according to claim 1, wherein the at least one downward open flow cavity forms at least one flow channel in at least one of the horizontal sections through the one membrane carrier, wherein the at least one downward open flow channel has a uniform width over more than 80% of a length of the at least one downward open flow channel.

6. The membrane filter according to claim 1, wherein the one membrane carrier has a cross section in each of the horizontal sections through the one membrane carrier which cross section decreases in a downward direction.

7. The membrane filter according to claim 1, wherein the base element includes the gas inlet for letting the gas into the base element.

8. The membrane filter according to claim 1, wherein the gas inlet for letting the gas into the base element is also for letting the gas into the liquid at the bottom of the base element.

9. The membrane filter according to claim 1, further comprising:

a gas distribution system;

a downward open and upward closed tube which includes a wail with downward open vertical slots for distributing the gas into the liquid; and the one downward open and upward closed tube includes an inner edge that is arranged between two of the downward open vertical slots that are adjacent to each other in the at least one vertical cross section for the downward open and upward closed tub, wherein each section of the inner edge is oriented at an angle of less than 60° relative to horizontal at least in a portion of a lower half of the downward open vertical slots.

10. A method for filtering a liquid in a membrane filter, wherein the membrane filter includes a base element, a circumferentially closed tube, and a gas inlet, wherein the base element includes a tubular shell and one membrane carrier arranged in the tubular shell and connected by at least one anchor location with the tubular shell, wherein hollow fiber membranes are attached at a top of the membrane carrier, wherein the circumferentially closed tube adjoins the tubular shell at a top of the tubular shell, wherein the base element includes at least one downward open flow cavity between the tubular shell and the membrane carrier, wherein the at least one downward open flow cavity includes an outlet at a top of the base element leading out of the base element into the circumferentially closed tube, wherein the at least one downward open flow cavity is in contact with and adjacent to the tubular shell and also in contact with and adjacent to the one membrane carrier in each horizontal section through the one membrane carrier, wherein the at least one downward open flow cavity envelops the one membrane carrier and forms an annular gap, wherein the annular gap is only interrupted by the at least one anchor location, wherein a height of the at least one downward open flow cavity equals an overlap portion of a height of the one membrane carrier and a height of the tubular shell, wherein the one membrane carrier closes the base element completely for a flow of the liquid from a bottom of the base element to a top of the base element with an exception of the at least one downward open flow cavity, and wherein the circumferentially closed tube extends beyond an upper end of the hollow fiber membranes, the method comprising the steps:

flowing the liquid into the base element, flowing the liquid through the at least one downward open flow cavity and thus flowing the liquid around the one membrane carrier;

flowing a gas through a gas inlet into the base element by initially letting the gas into a tub which then flows out openings in the tub into the at least one downward open flow cavity;

flowing the liquid only through the outlet at the top of the base element out of the base element and flowing the liquid from the outlet at the top of the base element only into the circumferentially closed tube, flowing the gas out of the outlet at the top of the base element into the circumferentially closed tube and generating a rising gas flow in the circumferentially closed tube and thus generating a rising liquid flow in the membrane filter;

flushing the hollow fiber membranes on an outside of the hollow membranes with the rising liquid flow and the rising gas flow;

providing a pressure differential between an outside of the hollow fiber membranes and lumens of the hollow fiber membranes, wherein the pressure differential causes a liquid permeate to be filtered out of the liquid and to flow into the lumens of the hollow fiber membranes; and collecting the liquid permeate from the lumens and flowing the liquid permeate out of the membrane filter;

flowing the gas through the gas inlet into the at least one flow cavity; and subsequently, flowing the gas together with the liquid through the base element in the at least one downward open flow cavity between the tubular shell and the one membrane carrier and flowing the liquid and the gas through the outlet at the top of the base element into the circumferentially closed tube, wherein the at least one downward open flow cavity includes bulges extending into the one membrane carrier.

11. The method according to claim 10, wherein the liquid and the gas flow completely around the one membrane carrier in at least one of the horizontal sections through the one membrane carrier.

12. The method according to claim 11, wherein the membrane filter is submerged in the liquid.

13. The method according to claim 10, wherein the membrane filter is submerged in the liquid.

14. The method according to claim 11, wherein the liquid is supplied to the base element by a first liquid conduit and let out from the membrane filter at a top of the membrane filter by a second liquid conduit.

15. The method according to claim 13, wherein the liquid is supplied to the base element by a first liquid conduit and let out from the membrane filter at a top of the membrane filter by a second liquid conduit.

16. The method according to claim 10, further comprising:
flowing the gas through the gas inlet into the liquid at the bottom of the base element.

17. The method according to claim 10, further comprising:
flowing a gas through a gas inlet into a base element into a downward open and upward closed tube; and
flowing gas out of the downward open vertical slots into the at least one flow cavity,
wherein the base includes a gas distribution system connected to the at least one downward open and upward closed tube which includes a wall with downward open vertical slots.

* * * * *

UNITED STATES PATENT AND TRADEMARK OFFICE
CERTIFICATE OF CORRECTION

PATENT NO. : 11,141,700 B2
APPLICATION NO. : 15/062152
DATED : October 12, 2021
INVENTOR(S) : Dirk Volmering and Klaus Vossenkaul It is certified that error appears in the above-identified patent and that said Letters Patent is hereby corrected as shown below:

On the Title Page

Replace the Title Page with the attached Title Page showing the corrected number of drawing sheets.

In the Drawing Sheets

Replace drawing sheets 1 through 15 with the attached drawing sheets 1 through 16, including new FIGs. 5F and 5G.

Signed and Sealed this
Twenty-sixth Day of September, 2023

Katherine Kelly Vidal
*Director of the United States Patent and Trademark Office*

(12) United States Patent
Volmering et al.

(10) Patent No.: US 11,141,700 B2
(45) Date of Patent: Oct. 12, 2021

(54) MEMBRANE FILTER AND FILTERING METHOD

(71) Applicant: MEMBION GMBH, Roetgen (DE)

(72) Inventors: Dirk Volmering, Aachen (DE); Klaus Vossenkaul, Aachen (DE)

(73) Assignee: MEMBION GMBH, Roetgen (DE)

(*) Notice: Subject to any disclaimer, the term of this patent is extended or adjusted under 35 U.S.C. 154(b) by 984 days.

(21) Appl. No.: 15/062,152

(22) Filed: Mar. 6, 2016

(65) Prior Publication Data
US 2017/0087518 A1  Mar. 30, 2017

Related U.S. Application Data

(63) Continuation of application No. PCT/EP2014/069342, filed on Sep. 11, 2014.

(30) Foreign Application Priority Data

Sep. 11, 2013 (DE) .......................... 102013218188.4

(51) Int. Cl.
*B01D 61/18* (2006.01)
*B01D 63/02* (2006.01)
(Continued)

(52) U.S. Cl.
CPC ............ *B01D 65/08* (2013.01); *B01D 61/18* (2013.01); *B01D 63/02* (2013.01); *B01D 63/024* (2013.01);
(Continued)

(58) Field of Classification Search
CPC ............ B01D 2313/26; B01D 2321/18; B01D 2321/185; B01D 63/024; B01D 63/043;
(Continued)

(56) References Cited

U.S. PATENT DOCUMENTS

| 4,396,510 A * | 8/1983 | Hsei ................. B01D 63/02 210/321.8 |
| 5,910,250 A | 6/1999 | Mahendran et al. |

(Continued)

FOREIGN PATENT DOCUMENTS

| DE | 10045227 C1 | 2/2002 |
| DE | 102011110591 | 2/2013 |

(Continued)

*Primary Examiner* — Ana M Fortuna
(74) *Attorney, Agent, or Firm* — Von Rohrscheidt Patents

(57) ABSTRACT

A membrane filter for filtering a liquid to be filtered, having a downwardly open base element through which flow can pass and which has a tubular shell and precisely one membrane carrier arranged therein, wherein the membrane carrier is connected to the shell by way of at least one anchoring point, having hollow fiber-type membranes fastened at the top in the membrane carrier, having a circumferentially closed pipe which, adjoining the top of the shell of the base element, surrounds the hollow fiber-type membranes, having a gas inlet into the base element, having at least one permeate collecting chamber, having at least one permeate outlet, and having at least one downwardly open flow chamber between the shell and the membrane carrier, which flow chamber has an outlet at the top, wherein the at least one flow chamber, in every horizontal section, adjoins both the shell and the membrane carrier.

17 Claims, 16 Drawing Sheets

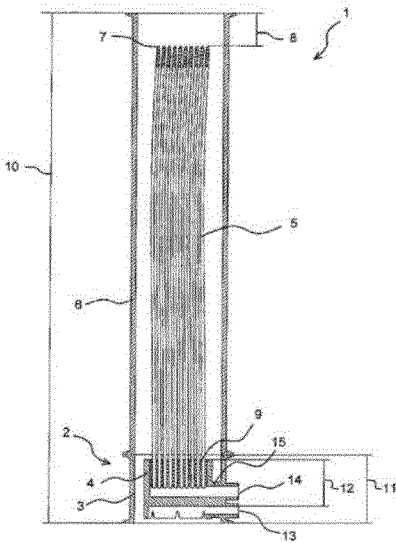

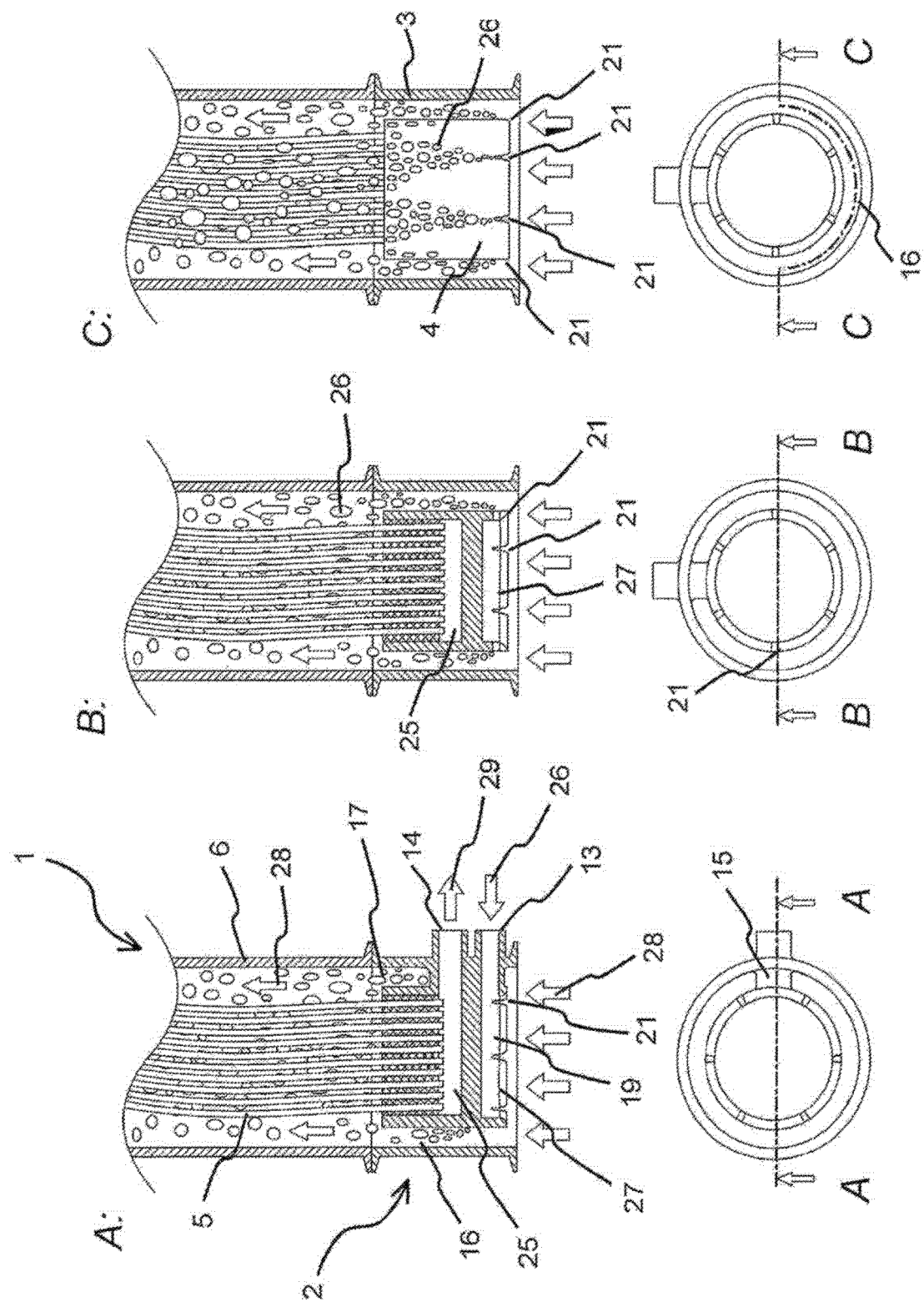

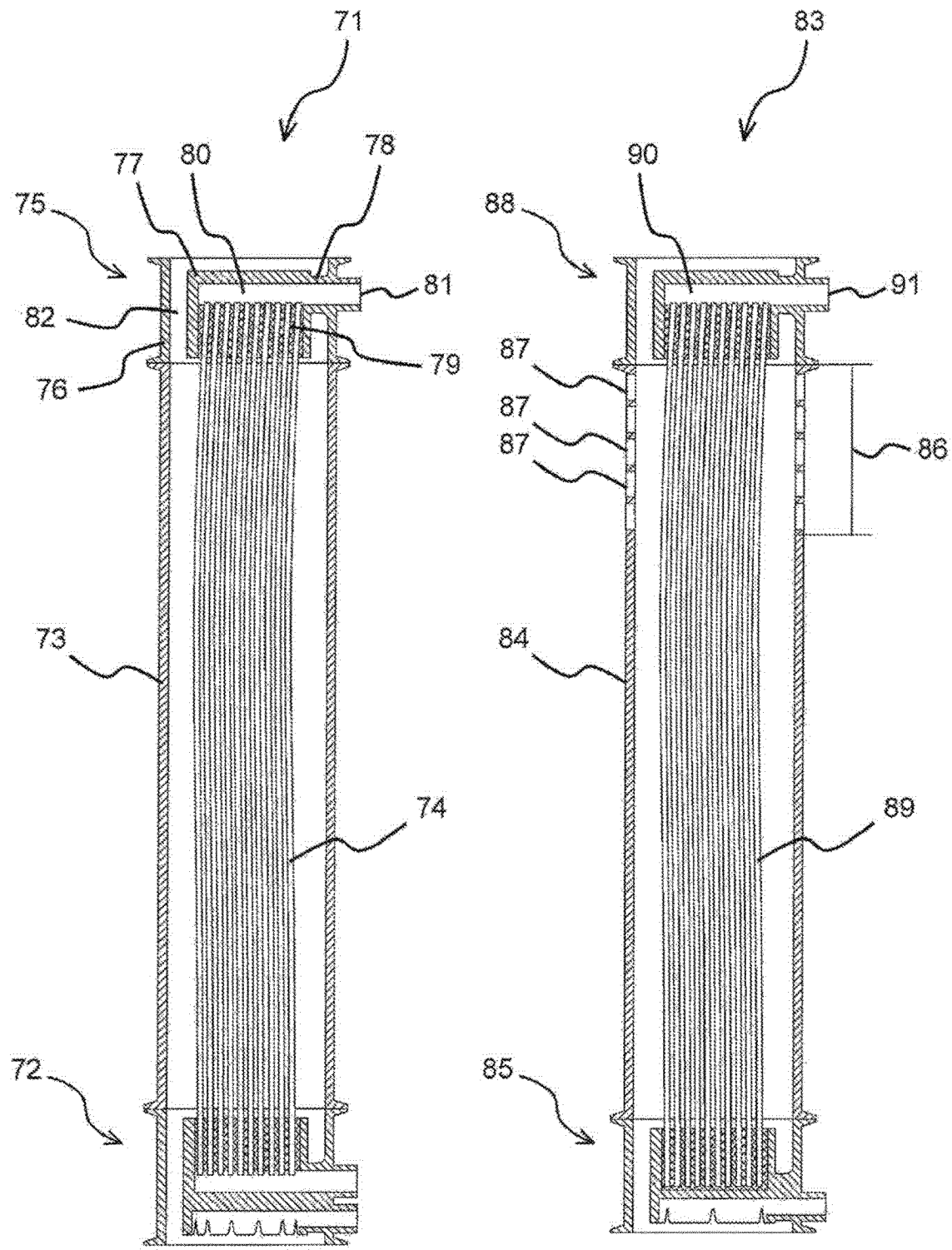
FIG. 7A  FIG. 7B